(12) United States Patent
Shackelford

(10) Patent No.: US 6,227,931 B1
(45) Date of Patent: May 8, 2001

(54) ELECTRONIC INTERACTIVE PLAY ENVIRONMENT FOR TOY CHARACTERS

(76) Inventor: Judith Ann Shackelford, 615 N. Camden Dr., Beverly Hills, CA (US) 90210

( * ) Notice: Subject to any disclaimer, the term of this patent is extended or adjusted under 35 U.S.C. 154(b) by 0 days.

(21) Appl. No.: 09/347,623

(22) Filed: Jul. 2, 1999

(51) Int. Cl.[7] .............................. A63H 3/00; A63H 3/52; G09B 19/00
(52) U.S. Cl. ..................... 446/268; 446/477; 446/484; 434/156
(58) Field of Search .................... 446/175, 219, 446/268, 476, 477, 482, 484, 485; 434/156, 157

(56) References Cited

U.S. PATENT DOCUMENTS

| | | | |
|---|---|---|---|
| 3,269,034 | * | 8/1966 | Glass et al. ................. 446/482 X |
| 4,777,938 | * | 10/1988 | Sirota .......................... 446/301 X |
| 5,041,044 | * | 8/1991 | Weinreich .................... 446/219 X |
| 5,655,945 | * | 8/1997 | Jani ................................ 446/175 |

* cited by examiner

*Primary Examiner*—D. Neal Muir
(74) *Attorney, Agent, or Firm*—Ronald M. Goldman

(57) ABSTRACT

A child's electronic playset defines a setting or character environment (1) for various toy characters (57–62), play pieces, representing persons or fantasy characters, which the player may move about that environment. Through its electronics (90) the environment possesses built-in intelligence and defines virtual beings through spoken messages which are attributed by the player to the toy characters, creating a virtual universe. Markers (65) identify each toy character to the environment when checked by the environment's sensors (90, S1–S48) enabling the environment to know which characters are present and to call up an appropriate dialog there between to broadcast through a loudspeaker (92). The environment also keeps track of the time of day, enabling it to know the order in which toy characters are placed in the environment and possess the ability to call up a dialog appropriate to certain hours in the day.

42 Claims, 6 Drawing Sheets

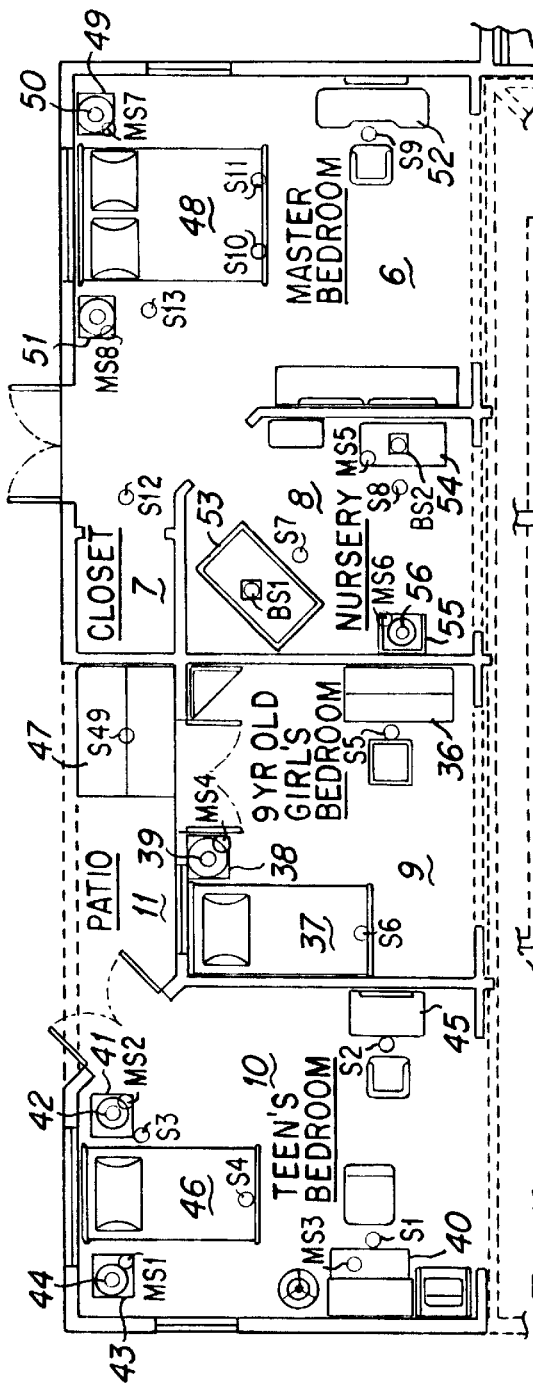
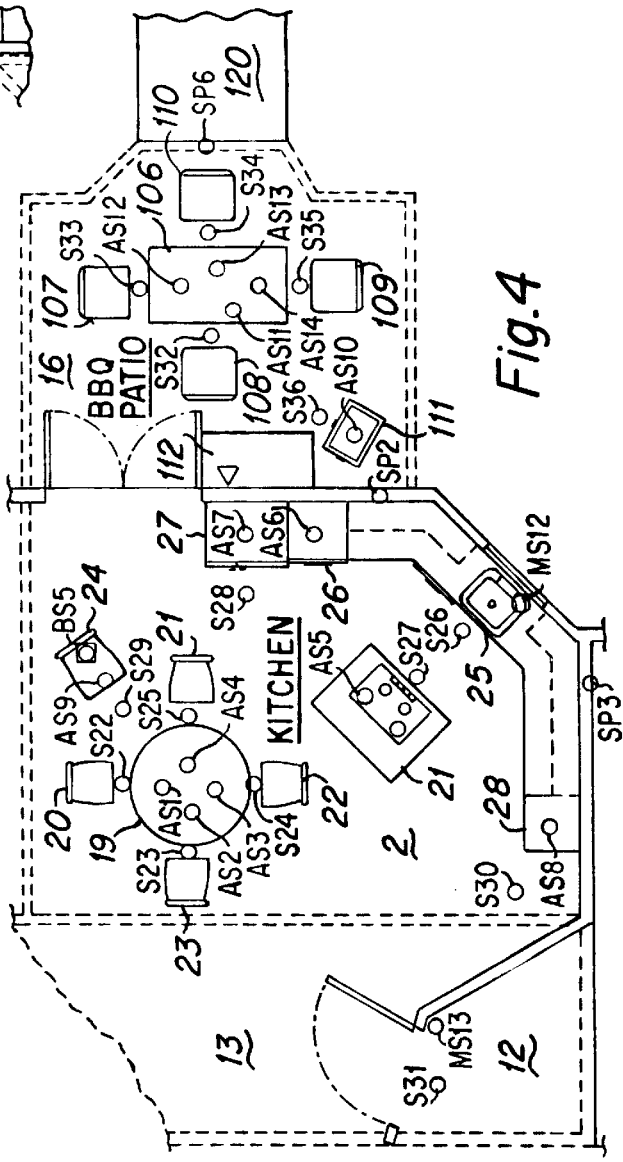
Fig. 3
Fig. 4

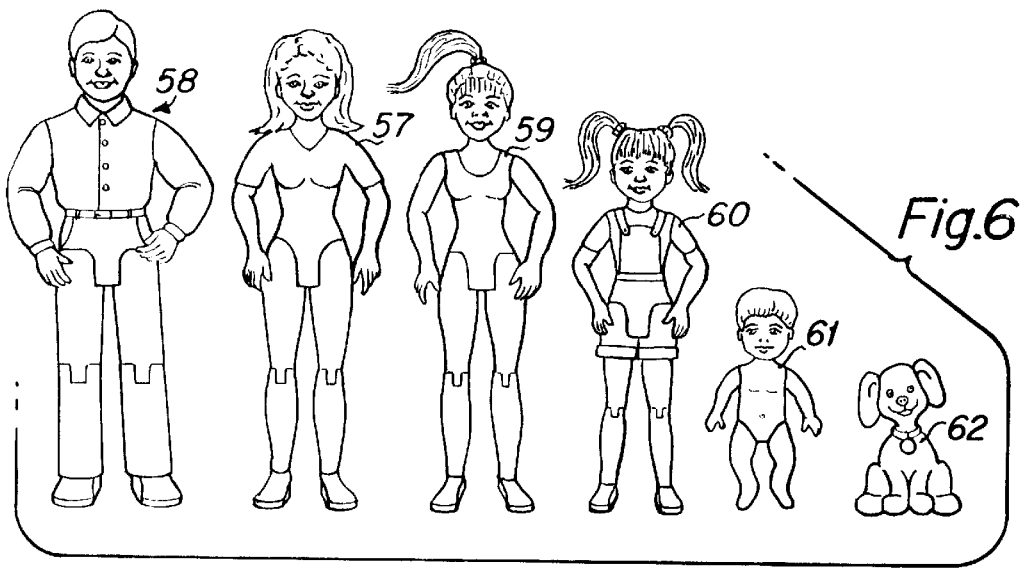
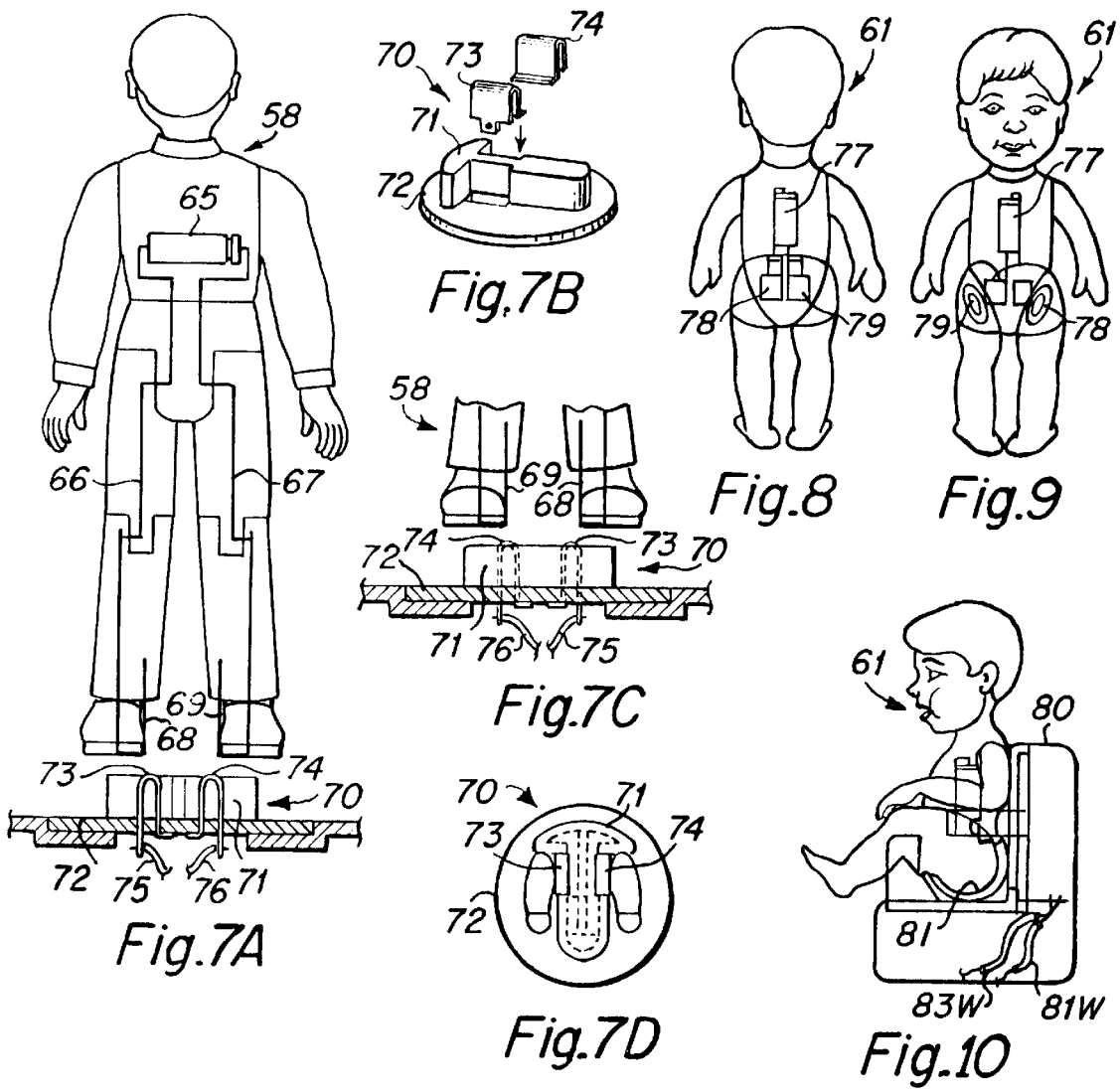

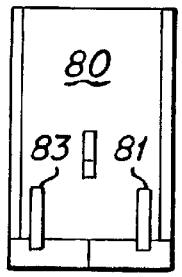
Fig.11
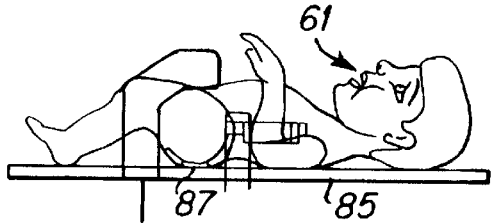
Fig.12
Fig.13A
ICE CREAM
Fig.13B
PITCHER OF...
Fig.13C
CARTON OF...
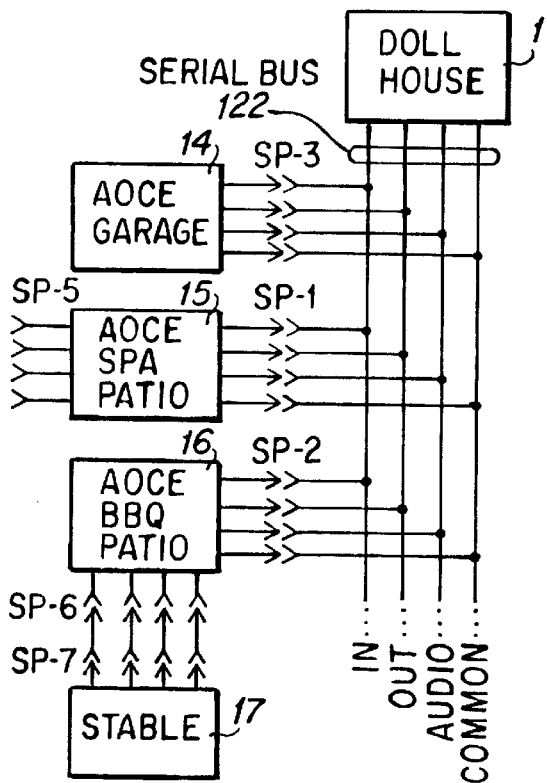
Fig.17
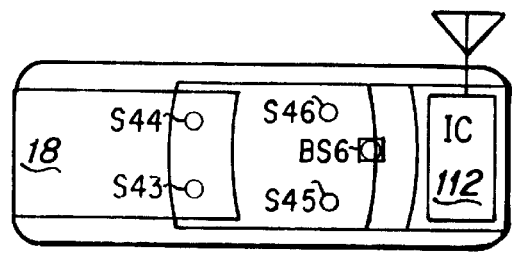
Fig.18
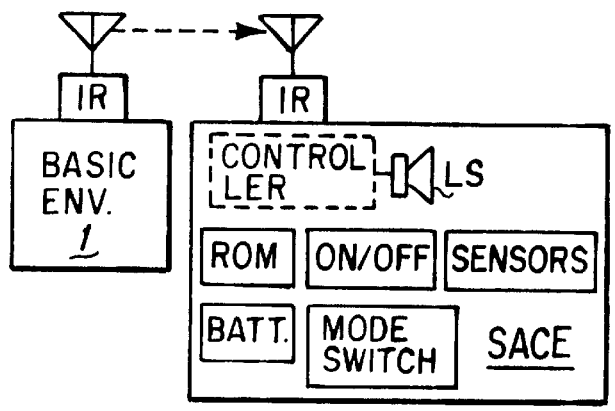
Fig.19

ELECTRONIC INTERACTIVE PLAY ENVIRONMENT FOR TOY CHARACTERS

FIELD OF THE INVENTION

This invention relates to children's interactive electronic toys, and, more particularly, to an improved electronically controlled interactive play environment. The invention provides a character environment, as example, a doll house, that is inhabited by toy characters and the environment imparts virtual beings to those toy characters and a virtual universe, that simulates real life and/or a fantasy experience.

BACKGROUND

Historically, children have played with dolls, plush characters, action figures, vehicles, fantasy characters, personified objects, or other toys of all shapes and sizes, collectively and generically referred to as "characters", in and/or upon various toy dwellings, houses, structures, buildings, playsets, platforms, stages, floors, fields, vehicles, ships, boats, planes, spacecraft, and other environments, collectively and generically referred as "character environments" or, alternatively more simply, as "environments".

As example, a favorite character environment for young girls has been the doll house. Girls often spend hours arranging toy furniture and characters in and about a doll house. A known example for boys is a parking lot and gasoline station play set. Boys often spend long periods moving small toy cars about, up and down ramps and the like in the playset. Those character environments provide a stage for expression of the child's fantasies about the toy characters.

More recently, electronics devices have been integrated into both characters and the character environment, such as the integrated circuit ("IC") chip, speech synthesis chip, and other electronic components. Initially, the electronics provided only sound effects and speech, which enhanced play. As example, such sound effects included doorbells ringing, telephones ringing, and of toilets flushing in dollhouses; included sounds of vehicle motors and screeching tires in garages and race tracks; and included sounds of rockets blasting, laser weapons firing, and explosions occurring in spacecraft. In some character environments, the electronics also synthesized and broadcast a characters voice(s), enhancing realism and/or fantasy play.

Then virtual pets and dolls, based on more sophisticated electronics, added a new dimension to play. They introduced artificial intelligence to those pets and dolls, giving them a more lifelike character. By means of various sensors, more and more toy characters now "know" what the child is doing with the toy character and the position the toy character is in.

The addition of a clock or other time-keeping device, programming logic relating to the character's needs relative to particular times of the day as indicated by the clock, the character's health, happiness and well-being relative to whether or not the character's requests have been responded to by the user, and sensors that enable the character to know what the child is doing with or to the character and if the child has responded to the character's needs or requests, has given these characters "virtual intelligence." Like a living being, the toy characters are "smart." They actually "know" what they need and what actions are appropriate to do at particular times of the day.

As example, a virtual pet has specific needs at particular times of the day, such as to be fed and watered, cleaned-up after defecating, bathed, played with, and go to sleep. If the pet's needs are not met by the child, then the pet will become ill and will eventually expire or leave for another home.

The virtual doll is one that, typically, simulates a small female child, but may be ornamented to simulate other genders or fantasy characters as well. That doll is self-contained with its electronics hidden inside the doll's torso. As further example, a virtual female doll will awaken and sleep at times of day specified and entered by the parent. She has basic needs for food and water at appropriate mealtimes, such as breakfast, lunch, dinner, and snack-times. She will need to have her diaper changed and will know when she dirtied it. She will need her clothes changed from pajamas, her sleep wear, to a dress or play-outfit, her daytime wear, because she knows what clothing she is wearing. The sensors in her clothing communicate that information to the doll's electronic controller hidden within the doll's torso.

She will need to play games at appropriate play times, need to have her teeth brushed in the morning, after meals, and before bedtime. And she will want her hair brushed and need love periodically throughout the day. She will become unhappy and fussy if her needs for food, water, love, and being changed and attended to are not met; and, she will even become ill if she is left unattended for too long a period. She will communicate those human thoughts, phrases and requests to the child in a natural human voice. An example of such a doll has been marketed by the Playmates company, called "Amazing Amy".

By means of an integrated circuit chip or chips that store the appropriate programming and logic information and speech, and various other electronic components, such as a speaker, a speech synthesizer, batteries, and other components, the doll is made to behave and talk like a real child, asking the owner to feed her, change her, play games with her, put her to bed, and so forth. The doll will become cranky and fussy if she is not responded to, and will need medicine, love, food, water, and to be played with in order to become happy and well again.

Sensors, such as resistors, magnets, momentary switches, or other devices, allow the doll to know if she is being touched, what she is being fed, if she has been changed or had her hair or teeth brushed, played a game with the child, or been given medicine, had her temperature taken, or her nose blown by the child. Both virtual pets and virtual dolls have set a new standard of intelligence in toys, which make them virtually come alive.

Because the electronics allowing these characters to be "smart" or "virtual" are too large as a practical matter to fit inside physically small size characters, products such as small or mini dolls, action figures, animals, vehicles, fantasy characters, cartoon characters, and personified objects, lack the "smartness" that children are becoming accustomed to expect. To date, toy manufacturers have been unable to make those small size characters "virtual" or "smart." As a consequence those products have become less attractive relative to the foregoing "virtual" products, which children find more exciting. It may be said that the small sized characters, being inanimate, lack the emotional "sizzle" that attracts children to modern virtual toy products.

Unless some way is found to add virtual personality and intelligence to small size toy characters, those character environments are likely to fall completely out of favor and disappear, losing forever an important vehicle through which children develop and express their imagination. As an advantage, the present invention restores attractiveness to and revitalizes such character environments and its accompanying small size toy characters.

A principal object of the invention, therefore, is to impart a virtual personality and intelligence to small size toy characters.

An additional object of the invention is to revitalize and add attractiveness to children's play environments that better amuses and/or entertains small children.

A still additional object is to imbue a group of small size toy characters with apparent intelligence enabling those toy characters to intelligently interact with one another, with their environment and with the player.

A further object of the invention is to provide individual virtual beings to a group of individual small size toy characters associated with an environment without requiring the characters to contain electronic controllers.

A more specific object of the invention is to provide a play environment that imparts a virtual being to separate inanimate toy characters deposited in the environment.

And an ancillary object of the invention is to amuse, preoccupy for extended periods and help develop the imagination of young children.

It is also found that the prior virtual pets and dolls do not permit the child to exercise control over the play pattern. The electronic pet toy previously marketed by the Bandai company as the "Tamagotchi™" and another marketed by the Playmates's company as "Nano™" was programmed so that the virtual pet aged one year during the course of one day of real time, thereby simulating the lapse of a greater period of time, but the user could not exercise any control over that event. As an adjunct to the foregoing invention, an additional feature to enhance play of virtual pets and dolls of the prior kind and to the environment of the kind described in the following specification, the invention allows the child to be able to have greater control over the play pattern, in other words, to be able to pretend an entire day's play with a doll or pet or character in a compressed time period when and if the child desires to do so.

To the foregoing end, the invention includes means to force the environment cycle through an entire day's activity, compressing the day into a predetermined period of time, such as one hour in order for a child to more rapidly involve him/herself in the play activities of an entire day in a shorter period "play day", if desired. The foregoing subsidiary invention can also be incorporated within the existing kinds of virtual pets and dolls.

Thus, a still further object of the invention therefore is to detach events that are to occur at specific times of day during operation of the foregoing environment, or in virtual pets and dolls and attaching those activities to an artificial time that progresses more rapidly than real time.

And a still additional object of the invention is to permit a player of a character environment, virtual pet or virtual doll to force a day for such environment, pet or doll to transpire more quickly than a real day.

SUMMARY

In accordance with the foregoing objects and advantages, the present invention offers a "virtually smart" character environment that imparts a "virtual being", including virtual intelligence and personality, to each toy character inhabiting that environment. The characters need not hold any active electronics to produce an individual virtual being, as in existing virtual dolls, only an identifier, identifying the character to the environment. Much like a ventriloquist gives personality to his dummy by giving the illusion that the dummy is speaking, the environment speaks for the characters, giving the illusion that the toy characters are speaking.

The environment contains sensors and a controller that detects each small character inhabiting the environment and enables each character to appear to have intelligence, "know" what it needs, knows what is appropriate to do throughout the day, week and year, knows what the other characters are doing and saying, intelligently interact with the other characters and with the player.

Through the sensors and identifiers on the characters, the environment senses which characters are in specific locations throughout the environment at a particular time of the day and on a particular day of the week and month of the year. Speech is generated and produced through the loudspeaker, created in a voice that is specific to each character. The child or other player is able to "hear" each of the tiny characters talk to one another, or "think" out loud, about various activities and engage in various play scenarios throughout the day, week, month, and year. The invention creates an illusion that each character is alive and intelligent, or, at least, simulates such a virtual doll.

The multiple characters inhabiting the environment may carry on a conversation amongst themselves, as the player listens, think about where they are placed in the environment (by the player) and express their needs. In this sense the environment and the inhabiting characters simlulate a stage and the characters those of a live play that is controlled and directed by the player.

The character environment may be defined in any desired theme. As example, those themes include those of classic playsets for girls, such as a doll house or home with a family or friends, to various buildings or structures, such as a shopping mall with teenage shoppers, a college dormitory with college students and the like. Many other known themes should be apparent.

An additional aspect of the invention provides for modular structures; a basic environment to which additional modules may be added. Modules may comprise an additional room that is attached or in alternative environments the additional modules may be ones that stand-alone.

An further aspect to the invention permits speeding up an environment's day. This aspect is characterized by a mode switch and associated programming that permits the time of day to be advanced from real-time to a faster rate of progress. Any time display then displays an artificial time, so to speak, an environment time of day.

The foregoing and additional objects and advantages of the invention together with the structure characteristic thereof, which was only briefly summarized in the foregoing passages, becomes more apparent to those skilled in the art upon reading the detailed description of a preferred embodiments of the invention, which follow in this specification, taken together with the illustrations thereof presented in the accompanying drawings.

BRIEF DESCRIPTION OF THE DRAWINGS

In the drawings:

FIGS. 3, 4 and 5 are layouts of specific regions found within the layout of FIG. 2, drawn to an enlarged scale;

FIG. 6 illustrates toy characters used with the embodiment of FIG. 1 and defines therewith an embodiment of the playset;

FIG. 7A illustrates a character and its identification marker and the configuration of a sensor used in the doll house environment of FIGS. 1 & 2;

FIGS. 7B, 7C and 7D illustrate additional aspects of the sensor construction;

FIGS. 8 and 9 illustrate the baby character and its identification marker in rear and front views, respectively;

FIGS. 10 and 11 illustrate one of the baby character sensors in front and side view;

FIG. 12 illustrates another baby sensor for identifying the baby sensor when placed lying on its torso backside;

FIGS. 13A, 13B and 13C illustrate three articles of foodstuff used in the embodiment of FIG. 1;

FIG. 17 is a schematic illustration of the serial bus connection between the basic environment and the add-on character environments;

FIG. 18 is a layout of the automobile self contained character environment used with the embodiment of FIGS. 1 and 2, earlier illustrated in a reduced scale; and FIG. 19 illustrates an embodiment of an expanded character environment in which physically separate portions connect via a wireless communication link.

DETAILED DESCRIPTION OF THE PREFERRED EMBODIMENTS

Figure 1:
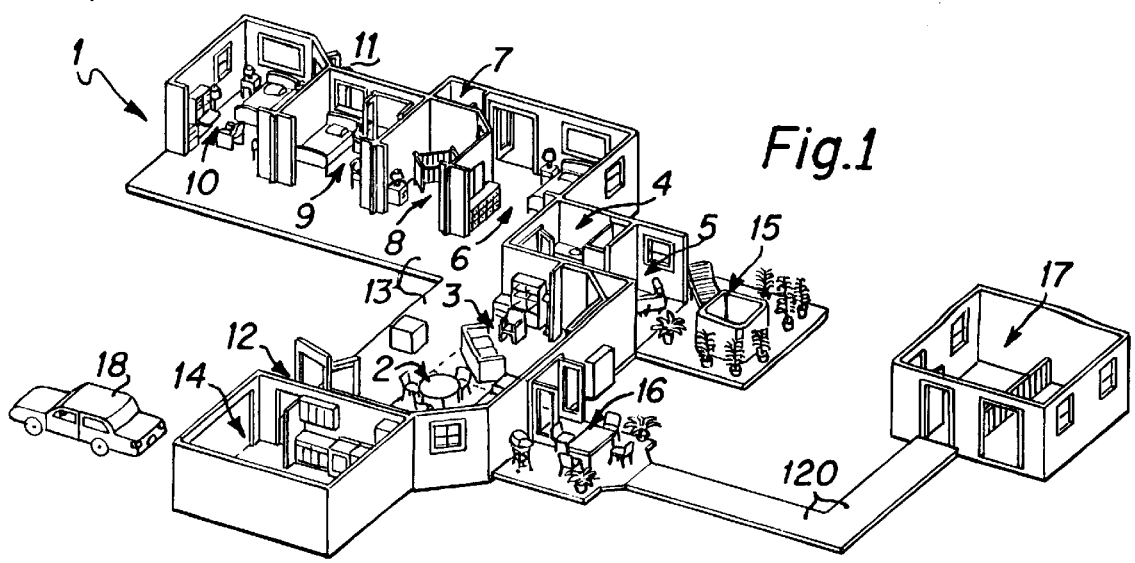
FIG. 1 partially illustrates an embodiment of the invention in perspective, specifically in the form of a doll house.
Figure 2:
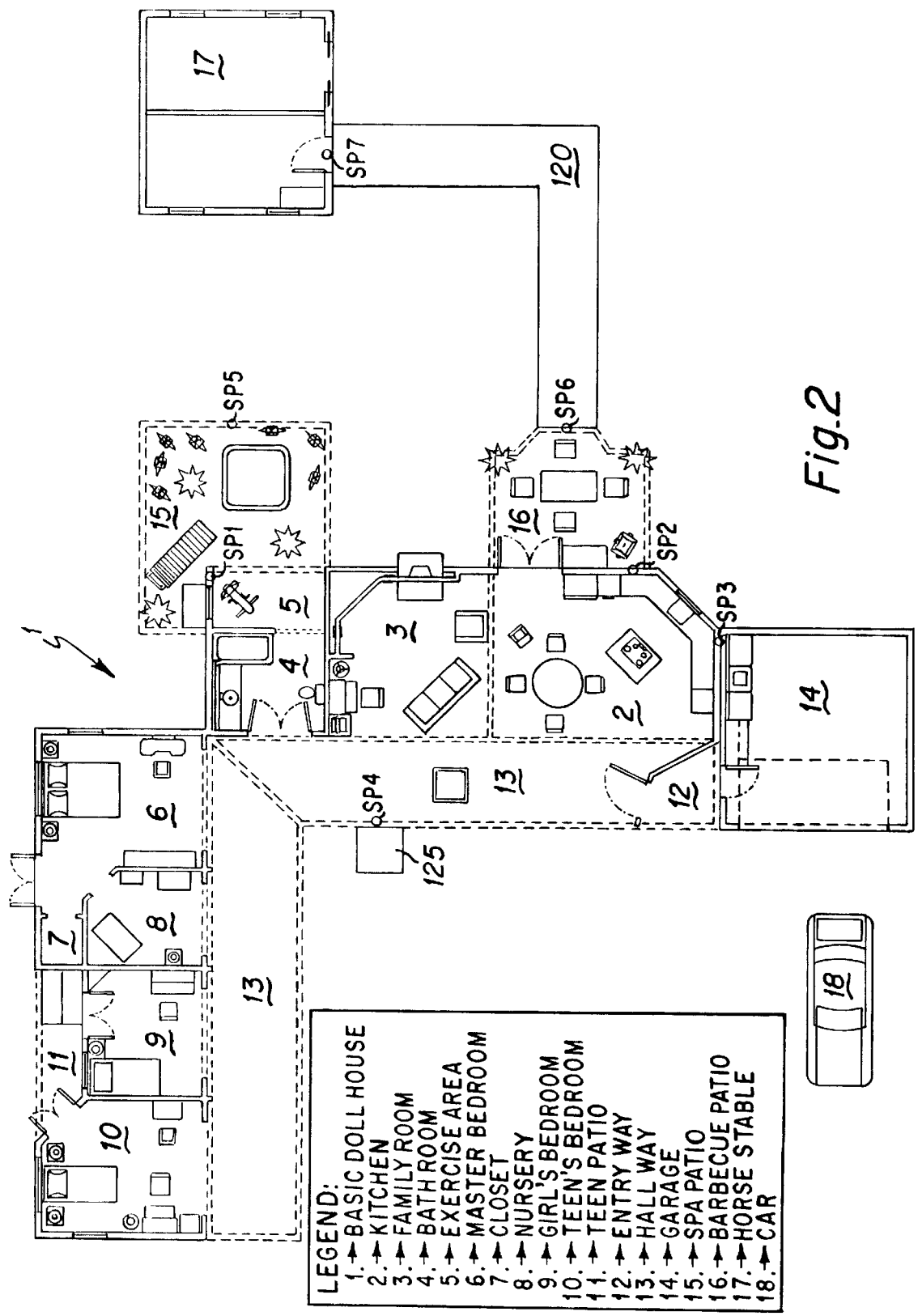
FIG. 2 is a layout of the embodiment of FIG. 1.

The preferred embodiment includes an environment, such as illustrated in FIGS. 1 and 2 and a cast of characters to inhabit that environment, such as illustrated in FIG. 6. Reference is first made to FIGS. 1 and 2, which respectively provide a partial perspective and layout of an environment constructed in accordance with my invention, including the appearance and floor plan of a basic doll house 1 that serves as the play environment. The basic doll house floor plan includes a kitchen 2, family room 3, bath 4, exercise area 5, master bedroom 6, including a closet 7, a nursery 8, bedroom 9, teen bedroom 10, teen patio 11, an entry way 12 and a hall way 13, which may be conventional for a doll house.

A garage 14, spa patio 15, barbecue patio 16 and horse stable 17, also illustrated in those views are "add-on" character environments, and do not form part of the basic doll house. Likewise car 18 shown in the two figures is called a "stand-alone" character environment, and does not form part of the basic doll house. Both the add-on and stand-alone environments are optional units which may be added to the basic doll house for enhanced play. Those units are described more fully later herein.

Figure 5:
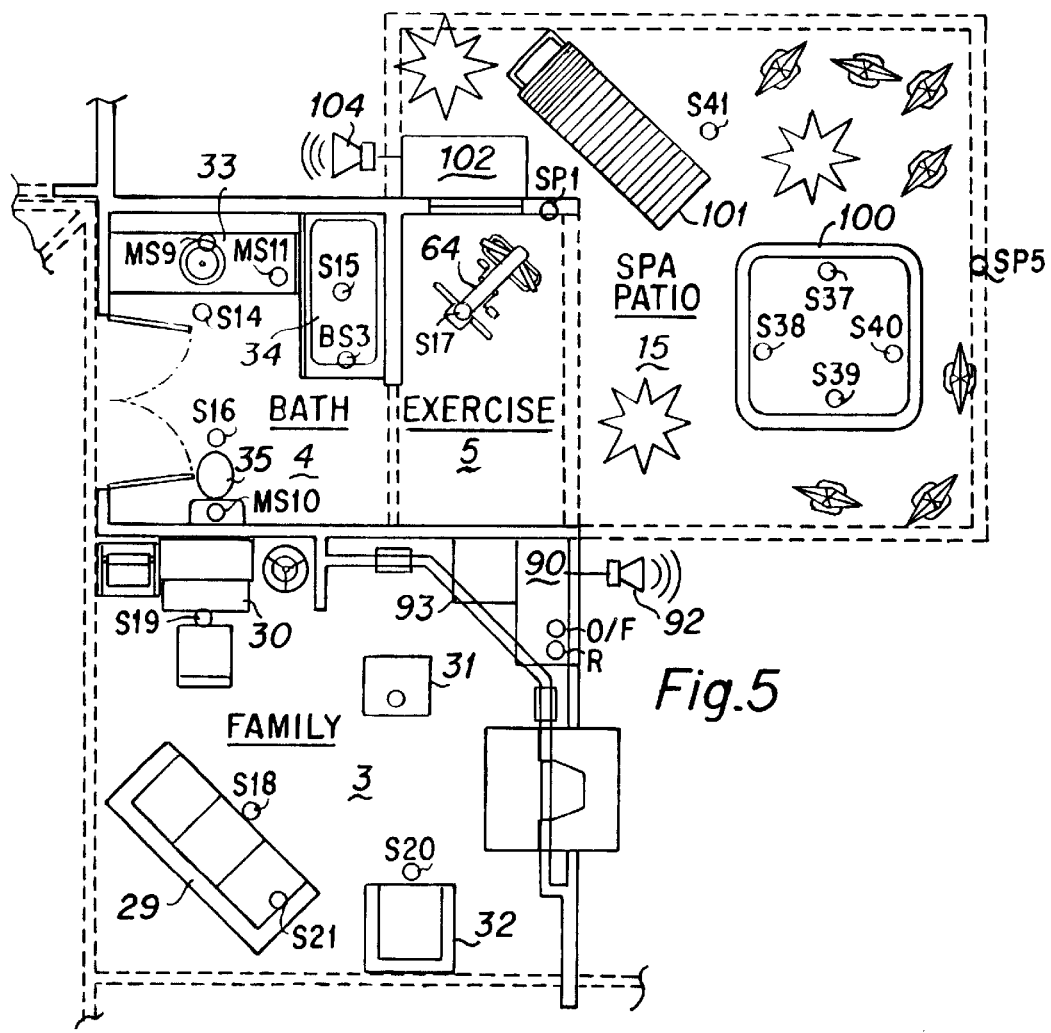

The foregoing environment is also stocked with furniture and appliances that may be permanently fastened in place at various locations in the layout, which may be more easily viewed in the enlarged scale of those regions presented in FIGS. 3, 4 and 5. As example, the kitchen 2 (FIG. 4) contains a table 19 and four chairs 20–23, a baby's high chair 24, sink 25, cook-top 26, refrigerator 27 and pantry 28; family room 3 (FIG. 5) contains a sofa 29, computer 30, playpen 31 and lounge chair 32; the bath 4 includes a sink 33, tub 34 with shower and toilet 35; bedroom 9 (FIG. 3) contains a computer 36, bed 37 and a night stand 38 with a lamp 39; bedroom 10, the teen's bedroom, includes a computer 40, night stand 41 with telephone 42, another 43 with a lamp 44, a vanity 45 and a bed 46, and the associated patio 11 contains a to dog-house 47; master bedroom 6 contains a bed 48, nightstand 49 with a lamp 50, a telephone 51, and a vanity 52; the nursery contains a crib 53, layette 54 and a nightstand 55 with a lamp 56. Containing an LED, lamp 56 actually lights. The exercise room contains an exercise bike 64. Other articles, not illustrated, may be added, and placed at various locations within the doll house at the player's discretion.

In practical embodiments the doll house can be constructed in various sizes, such as the size of the familiar Barbie® doll scale house, or be of a smaller scale with dolls approximately 4 inches tall, or tiny figures such as one inch micro dolls.

The toy character family that inhabits the doll house is pictorially illustrated in FIG. 6 to which reference is made. This includes five characters: A mother doll 57, who, in keeping with our purpose in bringing out "virtual characters", we name "Mom"; a father doll 58, who we call "Dad" or "Bill"; a teenage daughter 59, who we call "Erin"; a pre-teen daughter 60, the sister, who we can call "Taylor"; and an infant 61, the baby, "Baby Billy". No less a member of the family, a dog 62 is included. The characters are recognized by their appearance; they are visually distinguishable. Except for the infant, they are physically independent and free-standing.

Excluding the dog and the baby, the toy characters are, preferably, of the familiar articulated construction; each of the person characters legs pivot at the torso, the legs bend at the knee and their arms attach to the torso through a pivotable shoulder joint. The player is able to move the character's arms and legs, enabling the characters to stand, sit, lie down, reach for and hold things, which adds to the play value of the environment. The player may selectively individually place those characters in any room of the doll house, and move them around as part of the player's fantasy play.

The dolls may be constructed of molded plastic material as is the conventional practice, suitably cosmetically sculpted and painted in this preferred embodiment to depict people. Further, the characters may be clothed in fabric, contain flocked or rooted hair, or hair pieces, as is presently found in many small plastic dolls. Due to the cosmetic decoration and the like, unique to each, each doll is visually identifiable by the player.

Figure 14:
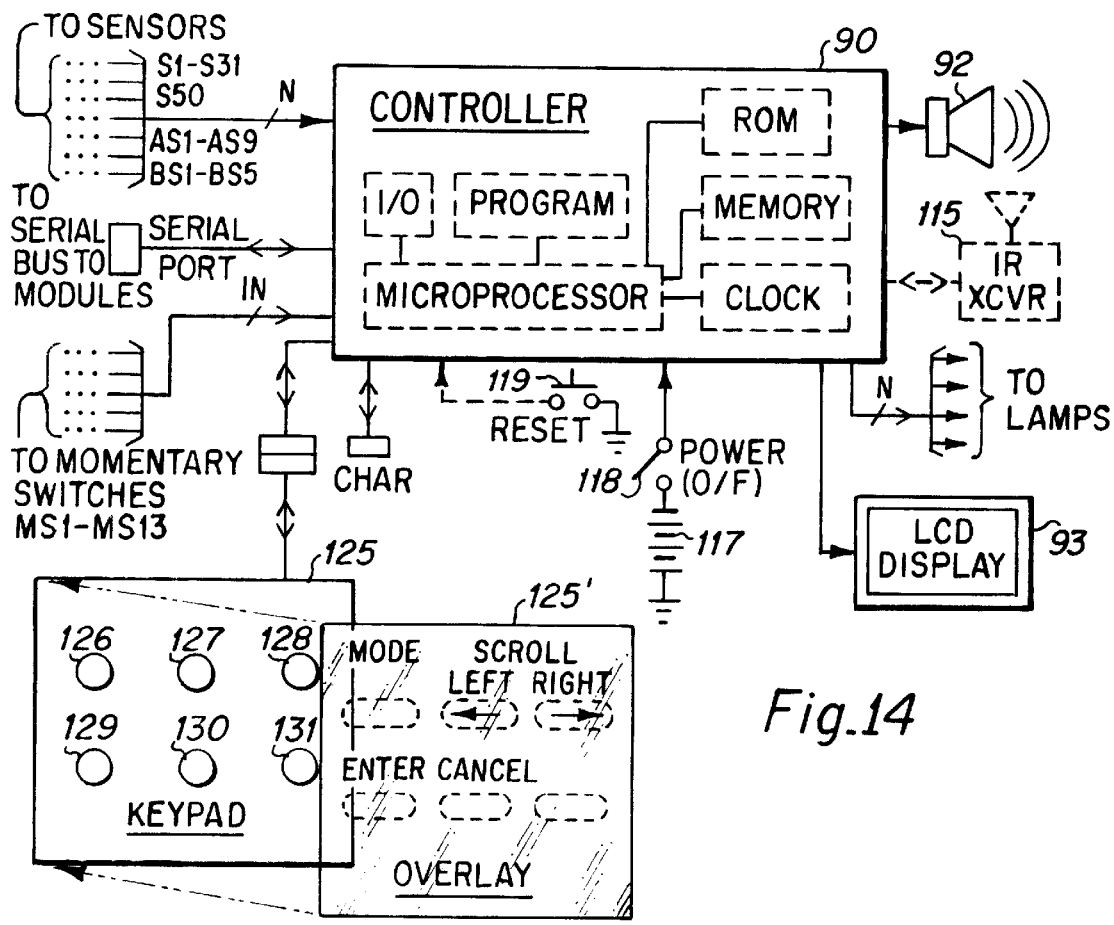
FIG. 14 schematically illustrates the electronic controller and associated elements and wiring internally contained within the embodiment of FIG. 1.

The environment is controlled by a computerized controller 90, illustrated pictorially in FIG. 5, and later herein described in greater detail, particularly in connection with FIG. 14. Each doll also contains a "marker" or identifier that also identifies the doll, as example by a code or other indicium by means of which the controller is able to identify the doll. The marker or identifier permits sensors, later herein described, that are distributed throughout the environment to obtain the characters identification and provide that information to the environment's electronic controller, also later described more fully. When the doll is placed in proximity to a sensor, such as atop a sensor, the sensor is able to extract the character's identification information and the electronic controller interprets that information. Hence, both the player and the environment are able to identify the individual toy characters, the one visually and the other electronically.

In one practical embodiment of the invention, the character's marker or identifier, as example, may be accessible from the bottom end of the character, that is, below the torso at the character foot end or shoes. And in one preferred implementation of the invention, the characters are identified by electrical resistors. Each resistor is of a unique resistance value assigned by the playset designer to each character.

As illustrated in the enlarged partial view of the bottom end of Dad 58 in FIG. 7A to which reference is made, that resistor 65, is encased within the character's torso, so as not to be visible to the player. The two end terminals of resistor 65 are connected via electrical wires 66 and 67, extending through the torso and legs to the exposed metal contacts 68 and 69, respectively, on the inner side of the foot or shoe. The wires extend through pivotal or rotatable electrical contacts at the leg and knee junctures, which is required due to the figure's articulated construction. As is appreciated, the foregoing foot end of the doll character essentially defines an electrical plug. In other less preferred embodiment, the toy characters need not be articulated. Alternatively, in less preferred embodiments, contacts 68 and 69 may shaped to define female receptacles respectively accessed through holes in the bottoms of the character's feet.

As shown, contacts 68 and 69 are spaced apart a certain distance and are flush with the side surface formed plastic shoe, embedded so that they cannot be removed by a child or drop off unintentionally. The foregoing provides an electrical series circuit between contacts 68 and 69 through resistor 65.

A sensor 70, separate therefrom and later more fully described, accesses the resistance and places it in a circuit to controller 90, essentially informing the electronic controller of the marker's character indicium. The controller is able to obtain an identification of the character by applying a small voltage to that series circuit, and, directly or indirectly, determine the resistance value, the number of ohms, or another electrical characteristic, such as the time to discharge a known capacitor, which is a function of that resistance value. That sensing is accomplished by electronically monitoring the current that flows in the series circuit resulting from applying a known applied voltage to that circuit, which is carried out by the electronic controller later herein described. As a more specific and preferred example, when the toy character is placed in the sensor, the character's resistor may complete and form part of a common series R-C circuit, whose discharge time is a function of resistance and capacitance. The value of the resistance may be determined by applying a known voltage to the circuit and, after a set time interval, checking the voltage level to which the capacitor has become charged. Alternatively, the capacitor may first be charged to a known voltage. The resistor is then switched into a series circuit with the charged capacitor to allow the resistor to gradually discharge the capacitor and reduce the voltage thereacross, the rate of discharge being dependent on the resistance value. The time taken for the voltage across the capacitor to fall to a selected lower voltage level, such as a number of nanoseconds or milliseconds, is measured by the controller later herein described. Thus one measured time identifies one toy character, another measured time identifies another of the toy characters, and so on. As is known, that time is mathematically related to and indicative of the resistance value.

Except for the resistance value, the marker construction and its contact spacing is identical in each of the other person and animal characters, except for Billy baby 61, later herein described. Dog character 62 contains the contacts on its paws and is sized to fit the same sensors that the Mom and Dad characters fit.

A practical embodiment for the corresponding sensors is illustrated in greater detail in FIG. 7A to which reference is again made and in associated FIGS. 7B, 7C and 7D. Sensor 70 is representative of sensor construction for those used to detect and permit identification of the stand-up toy characters. As shown in FIG. 7B, the sensor base may be formed with a T-shaped bar 71 atop a circular plastic base 72. The plastic base contains openings to the underside on each side of the stem of the T-member and a pair of U-shaped spring metal contacts 73 and 74 partially extend through those openings. As represented in FIG. 7A, viewing the toy figure from the rear, the figure's shoes are spaced by a distance slightly narrower than the spacing between the outer sides of the U-shaped contacts. FIG. 7C shows the foregoing portion of the toy figure from the front.

As shown in FIG. 7D, when the toy character is inserted into place on sensor 70, the metal contacts on the sides of the shoes press against the respective resilient metal contacts 73 and 74 in the sensor, establishing a firm electrical connection there between. If the toy character is not properly positioned in the sensor, the shoe contacts will be positioned adjacent the insulated side of T-stem 71 and cannot grip the contacts. Electrical leads 75 and 76 extend on the underside of the sensor from the contacts to other wiring, not illustrated, and to an appropriate input of the electronic controller, elsewhere herein described in greater detail. It is appreciated that the sensors essentially define an electrical socket for the formed plugs on the end of the characters.

During play, after the environment has been powered up, the player places a selected doll on a sensor pressing the figure into the sensor. As the doll is being pressed into the receptacle, its foot side contacts, such as 68 and 69, press against contacts in the character sensor, such as 73 and 74 illustrated in FIG. 7A, respectively, making electrical contact and forcing the U-shaped contacts sideways slightly. The reactive force exerted by the contacts springiness ensures that the electrical contacts of the sensor make good electrical contact with the corresponding electrical contacts on the doll when the doll is plugged into the sensor. Alternatively, if the doll is constructed with legs that are able to flex sideways slightly, the contacts may be relatively stiff in characteristic.

Since Billy baby 61, like a real infant, is not intended to stand upright, the practical embodiment differs slightly from those used for the more adult characters, and, hence, the mechanical construction of the sensor also differs. Reference is made to FIGS. 8 and 9 illustrating baby character doll 61 in front and rear views. An electrical resistor 77 is encased within figure's torso, and electrical leads extend, internally, from each end of the resistor from that resistor to respective metal contacts 78 and 79 located in the figure's buttocks, where they are exposed for contact with an appropriate sensor.

The sensor for use with the baby character, called the baby sensor, is suitably included within the particular chair or article in which the baby character is placed, as example, in FIG. 10 to which reference is made. There the baby character is seated on a toilet 80, often referred to as the "potty". The potty contains the exposed contacts 81, only one of which is illustrated in this figure, that mate with those on the character's buttocks, when the toy character is properly seated. In turn the contacts are connected by electrical leads 81W and 83W which extend to the electronic controller, later herein described. FIG. 11 shows toilet 80 in front view, unoccupied, with both buttock contacts 81 and 83 in view.

When the baby character is to lie down, such as on a layette 85, like exposed electrical contacts on the layette, such as contact 87, make electrical contact with the dolls buttock contacts. And those layette contacts are wired, not illustrated, to the electronic controller. The baby character's legs are articulated at the hip. As a consequence, the infant character 61 may sit up in a high-chair or play pen, sit on a potty or lie down, as when in a layette or bed, as the preceding figures illustrate.

Alternative marker and sensor constructions may be employed. As example, an alternative marker and sensor construction for the baby character may include a magnet, encased in the respective character's torso, and a shaped or keyed section of the baby's body, keyed mechanically to the particular magnetic sensors for each. The magnetic sensor would receive and detect only those characters for which the sensor is physically keyed to accept, and when received, the character's magnet would close the sensor switch. Such a sensor either opens or closes a circuit. Hence, the controller would require a separate input for each of those sensors.

Play is not thought complete without eating and drinking. Reference is made to FIGS. 13A, 13B and 13C which illustrate examples of foodstuffs used in the doll house, a dish of ice cream 86, a pitcher of juice 87, and a carton of milk 88, repsectively. The foodstuffs contain a similar marker to that used for the characters. That marker is also an electrical resistor connected to a pair of metal contacts exposed on the underside, the latter being smaller in size than the contact arrangement for any of the toy characters. The mating sensor for these items, sometimes referred to as a food sensor, accordingly is smaller in size than that used with the toy characters. However, electrically, the food sensor operates in the same manner as the previously described larger size sensors to enable determination of the value of the identifying resistor, the marker indicium. Since the construction principles should be clear from the previous description, there is no need to describe the physical structure of these markers and their corresponding sensors in any greater detail. The sensors for these items are placed on various furniture and appliances as later herein described.

Reference is again made to FIGS. 3, 4, and 5, the enlarged layouts defining the doll house. Various toy character sensors, represented by small circles, are located at various positions in the layout. The kitchen 2 includes eight character sensors, S22 through S29, which enables the five inhabitants to be present in the room at the same time and be identified, four of whom may be seated in chairs at the kitchen table 19; a baby sensor BS5 located in the high chair, nine food sensors AS1 through AS9, and another character sensor S30 principally used by the dog character. Family room 3 contains at least four sensors S18 through S20; teen bedroom 10, four sensors S1–S4; bedroom 9, two sensors, S5 & S6; master bedroom 6 contains five sensors S9–S13; nursery 8 two sensors S7 & S8, and two baby sensors BS1 & BS2. The bathroom 4 contains three sensors, S14–S16, one of which is located on the toilet, and the bathtub 34 therein, contains a baby sensor BS3. The doghouse 47 on teen patio 11 contains a sensor S49, and the exercise bike 64 in exercise room 5 contains a single sensor.

As one appreciates, the number of sensors located in the rooms in other embodiments may differ from the foregoing in accordance with the goals of the designer. To produce other embodiments one may either add or delete a number of sensors without departing from the scope of the present invention. The sensors should be visible, enabling the player to locate and place a character on a selected sensor, should the player so choose during the course of play.

Some of the appliances and furniture contain sensors for detecting and identifying a foodstuff character placed on the sensor. Thus table 19 contains four food sensors AS1–AS4, kitchen stove 26 contains food sensor AS6, and refrigerator 27 contains a food sensor AS7. In the practical embodiment, although the identification markers and sensors for these additional items are like in construction used for the toy characters, the size and shape of the identification markers and of the associated sensors are different so that these additional items ("food characters") cannot fit into the sensors for the doll characters, and vice-versa.

The doll house also contains a plurality of momentary operated switches, such as switch MS-12 in kitchen 2. This kind of switch is closed by pushing on a push button to operate, which compresses a spring, and, due to the spring force, automatically reopens when the push button is released. These switches are placed in strategic locations, are wired to the electronic controller 90. The switches are associated with individual sound effects stored in the controller's memories and those sounds are reproduced by the electronic controller 90. Once switch operation is detected, the controller causes the sound effect associated with that switch to be generated.

Switch MS-12 is associated with the kitchen sink. It is associated with the sound of running water. A like switch MS-9 is located in the bathroom sink 33 in bathroom 4 and is associated with the same running water sound as the kitchen sink switch. Further, switch MS-11 is associated with the bathroom's shower and is associated with another different running water sound. Switch MS-10 is associated with the toilet. That switch is associated with a flushing sound.

Although the foregoing switches are devoted to sound effects, they are not the exclusive means to do so. Like stored sounds are associated with some of the appliance or food sensors, earlier identified. As example, the kitchen stove sensors, AS6 & AS7, are associated with a "sizzle" sound, the sound of food being cooked.

Some other switches are associated with the lamps 39, 44 and 50 found in the bed rooms. Those lamps contain light bulbs, such as light emitting diodes (LED) or other small bulbs. When the player operates the switch for the respective lamp, such as switch MS4 for lamp 39, the controller supplies current to the lamp, and the lamp lights. Moreover, the controller is preferably programmed to supply current to and turn some or all of the lamps on at dusk, and then turn them off at the toy character's bed-time.

The foregoing is not an exhaustive listing. A more complete listing of the sensors of all types and momentary switches contained in the basic doll house is given in Table 1, located at the rear of this specification.

Continuing with FIG. 5, the doll house also includes an electronic controller 90, one or more loudspeakers 92, a battery pack, located suitably in a compartment shown in the upper right corner of the family room. The controller also includes a serial port which is electrically connected to a serial bus and thence, to bus connectors in the environment. As shown, a serial bus connector SP-1 is located at a side of exercise room 5; a serial bus connector SP-5 is located on a side of the spa patio 15; another serial bus connector SP-2 is located on a side of kitchen 2 and at another side, connector SP-3; another bus connector SP-4 is located at a side edge of walkway 13; another SP-6 is located on a side of the barbecue patio 16 add-on module; and another SP-7 is located at front of horse stable 17 add-on. Optionally, the electronic controller also contains an infra-red or wireless type transceiver. The latter components are illustrated schematically in FIG. 14 to which reference is made.

Electronic controller 90, typically, is a programmed digital microcontroller or, as variously termed, computer, containing semiconductor memory and operating programs. Preferably, the controller is in the form of an integrated circuit (IC) chip, thought to be the least expensive approach for toy product, or, may comprise a group of such IC chips. The controller contains appropriate input and output devices and control circuits, a real-time clock, and is powered by batteries. Operation of the controller is controlled by software, that is computer programs, with the specific programs both operating system program and application program and data being stored in ROM. Some data and program material, described later herein, is stored in non-volatile memory, which the controller contains. The controller is programmed to perform the various tasks and functions which are further described herein.

Controller 90 contains inputs for and is electrically connected to all of the sensors, momentary switches, at least one serial port SP for connection to a serial bus, and for the IR transceiver. It contains outputs for and is electrically connected to LCD display 93, it contains an audio output electrically connected to loudspeaker 92, and contains inputs for and is electrically connected to the player's key pad communicator or, simply, keypad 125. The controller also includes an internal clock that keeps track of real-time and, during operation, displays that time on LCD display 93. The time of day is initially entered or set, as hereinafter described, after electrical power is supplied to the environment.

Electronic controller 90 is positioned inside the doll house in a compartment out of view. Electrical wiring, not illustrated, between the controller, the sensors and the serial ports are supported with wiring and/or on a circuit board underlying the doll house floor. The character sensors suitably are supported raised sufficiently from the surface of the circuit board so that the sensor face fits through aligned openings formed in the doll house's floor. The LCD display 93 is located on an inside wall of the doll house simulating a television screen. This allows the player to see what time it is and view any visual cues supplied by the controller during the initial set up of the environment when the power to the doll house is turned on to which the player responds to via manual activation of the keypad 125. The player or, more likely, the player's adult supervisor uses the keypad to input the initialization information into the controller, such as the present date and time, wake time and sleep time for each character, and any other player information that the controller is programmed to request.

An on-off switch 118 is located in the doll house structure for turning on electrical power to the controller and an optional reset switch 119 for resetting the controller without turning off the electrical power at switch 118. The reset switch operation causes the controller to terminate the program being run, without requiring entry of the data initially entered by the player. The power preferably is a battery or an energy pack of DC batteries 117.

IR transceiver 115 and the various serial bus connectors are not essential to the present embodiment or to any character environment, but are optional and preferred. Those components are included as background for the discussion of the expanded environments obtained with additional "add-on" environments later herein described in connection with FIGS. 15–19 in which the doll house of FIG. 1 serves as one component. For some of those embodiments controller 90 also electrically connects to and controls the IR transceiver 115 and the bus connectors, which are later herein discussed.

The player's hand control unit, Keypad 125 enables the player to communicate with controller 90. The keypad plugs into serial bus connector SP-4 in the doll house, located in this embodiment at a side edge of walkway 13 (FIG. 2), to provide the electrical path to controller 90, defines the purpose of each switch and recognizes its operation. It contains five or more switches, suitably membrane switches and an overlay sheet that fits into the keypad atop the membrane switches. The overlay contains printed information, such as graphics, words, and/or icons, that are positioned above each switch's push button when the overlay is in place. The switches include, a first switch 126 that is used to select the operating mode; a second switch 127 which is used to effect a scroll to the left; the third switch 128 that is used to effect a scroll to the right; the fourth 129 to enter the selection; and a fifth 130 to cancel. A sixth switch 131 is programmable or is used to enter the respective information printed on the overlay above the respective switch push buttons. Those switches are read by the controller.

When the environment is powered up and battery (DC) power supplied to controller 90, following initialization, the controller runs its start-up program, requesting that data be entered, which the controller stores the data entered in non-volatile memory, that is, memory which retains the entered data, until power to the environment is turned-off via power switch 118 or battery 117 fails. In the start-up program, the controller outputs a spoken query to the player, a speech cue prompting the player to scroll right or left, speaking the new hour each time until the player recognizes that the correct hour is attained and presses the enter button is pressed. When that information is entered by pressing the appropriate enter button on the keypad, another spoken cue prompts entry of the minutes, which the player scrolls to the correct minute, which the controller confirms by its spoken recitation, and the player again presses the enter button. The controller continues with prompts for the year, month and day in the same manner and the player responds in the same manner as described. In the preferred embodiment the controller also displays the aforedescribed cues visually upon liquid crystal display 93, as a supplement or as an alternative to the spoken cues.

A well known example of visual prompting appears in the "Amazing Amy™" doll, earlier mentioned. The Lucent Technologies digital answering machine No. 1775 is a well known example of a microcomputer controlled device that employs speech cuing of the user to set the device's clock, individually speaking each of the hours, minutes and days, and allowing the user to scroll to a respective number and day, each time speaking the new number and day as scrolling continues. It is recognized that one approach to such display may disadvantage the hearing impaired person, the other the visually impaired person. Concurrent displays would satisfy both.

The controller's program, as hereinafter described, then prescribes the chronological order in which the individual characters awaken and commence the morning activity, selecting from a number of alternative pre-programmed scripts of character statements and dialogs relevant to the particular wake time to render through the speaker. The controller will prescribe a script to run as each character prepares to go to bed and sleep.

In other embodiments the controller may also be programmed to cue entry of the wake and sleep times for the family of toy characters, giving a default wake and sleep time, in case the player does not enter appropriate times.

In more complex alternative embodiments, the same wake and sleep time queries may be displayed and appropriate data entry may be made individually for each of the toy characters. However, that is considered too burdensome for most persons and, moreover, would offer less variety than the aforedescribed options that are available through the programming. The latter alternative is therefore not preferred.

The controller is also preferably programmed to query the players favorite color and foods. Further, it is also preferably programmed to query for the things the teen toy character thought about during the day, the teen toy characters diary entries regarding her day, that character's "best friends", later herein described. In other embodiments the controller may also query the age in years to assign to each toy character. As those skilled in the art appreciate, except for the time of day, the other information, although preferable, may be omitted to construct less preferred embodiments, or additional ones added to create enhanced embodiments, but that all such embodiments fall within the scope of the present invention.

During its operation, initially and from time to time thereafter, controller 90 routinely checks the sensors in each room of and other locations within the doll house every few milliseconds to determine if a character has been placed atop a sensor, and, if so, the identification of that character on the sensor. In the preferred embodiment, as earlier described the markers or identifiers carried by each toy character is a resistance with a unique value, different from that used in any other toy character or sensed item in the set. Thus the electrical contacts in the sensors simply extend an electrical circuit from that resistance to the controller. The controller 90 measures or otherwise determines its ohmic value or a characteristic related to that ohmic value, such as the R-C discharge time, earlier described, and uses its determination to take further action prescribed in the program.

As a battery saving feature, the controller also checks for play activity. Should the player leave the playset alone for a predetermined period of inactivity, the controller places the playset in a "sleep mode", minimizing the generation of sounds and speech and the like power consuming functions. As part of that sleep mode it continues to check the character sensors from time to time to determine if at least one character has been moved, indicating the renewal of play activity, after which it restores full program operation.

The controller contains a library of stored sounds, voice messages and the like, generically referred to as verbal statements. It outputs selected stored sounds, voiced statements, and the like when and if called for during the running of its program through loudspeaker 92, examples of which are presented later herein.

The controller also maintains a library or, as variously termed, database that correlates resistance values and/or the R-C discharge times against the respective character assigned by the programmer to respective ones of those values. By consulting its internal library of that data, the controller knows which character is assigned the ohm value or R-C discharge time that was measured, thereby identifying the character to the program. Since the sensors are not moveable, the program applicable to a respective sensor is authored with the respective sensors location in mind. Hence, the program has the knowledge of the location essentially built-in. Alternatively, another of the controller's databases may contain a correlation between the sensors and their respective locations in the doll house's floor plan. With either approach, the controller thus knows the location of each sensor.

The controller also knows, that is checks and stores, the time of day at which it checked the respective sensors for the presence and identity of toy characters. Therefore if one character, "enters" a room at a later time than another character, the controller will know that order of entry. The controller can be further programmed to use that information to determine, as example, what program subroutine to select, as further example, which of many stored "conversations" or statements to select for broadcast through the speaker.

With the foregoing information and checking the time of day the controller during the course of a program selects a statement to be outputted through the loudspeaker as a verbal statement or select one of many stored conversation routines between two or more of the toy characters that were detected. In other words, if the controller finds Mom and Dad characters in the kitchen, the controller's program may call up "conversation routine No. 100151" from its conversation database.

Controller 90 is also programmed to maintain a state of health indicia for each toy character and will display that information on the LCD display. The display is enabled when the player presses the check health switch 131 on the keypad. Each virtual being associated with a toy character, including the dog and, if the horse stable is add-on module is included, the pony has a state of well-being, as determined by electronic controller 90, which includes their physical health and their happiness state of mind. When the player places a character on a sensor or pushes a switch, in addition to its other functions elsewhere earlier explained, the information is also logged in memory by the computer in one of a number of categories, referred to as an activity/responsibility category.

All of the various play patterns that the player has the toy characters do falls into a category. Categories may include nourishment, bodily functions, sleep, hygiene, grooming, exercise, love and attention, play, responsibilities and discipline, and/or family fun as example.

When an activity is performed, the controller adds a point in the proper category for that activity. As example, when controller 90 identifies a toy character at the kitchen table or the baby in the high chair, and also senses the presence of a foodstuff at the table or high chair, it is programed to assume that the characters have eaten, which is assumed to have a positive effect on health. If a respective activity is not performed in a predetermined period and/or after a period of time lapses, the controller subtracts a point from the respective category. In order for a character to be regarded as well or happy, the respective category for the character must maintain a certain point level or score. If the points remain above that level, the controller will display the state of well-being. If it falls below, the display shows well-being is poor. The LCD display is preferably a bar graph for each character.

Some of those activities may be based on the time of day, such as breakfast, lunch and/or dinner. The controller will also determine if there is any activity that should be done at a given time period, and if it has not been done at that time, subtracts the requisite point from the respective category.

Consider a virtual being. It is a virtual imitation of a living being with smarts and a personality. That is, a person or animal or other living creature will have individual intelligence, experience, wants, needs, requests, and a manner of expressing those that may convey aggressiveness, love, demanding, sympathy, understanding or any of the other human emotions, and vocal chords that give a person or animal a somewhat unique voice. That personality is conveyed to others by the persons through speech, sounds and non-verbal actions. If such is attributed to an inanimate object, such as a rocket ship or car, the object is effectively brought to life as a fantasy.

Within the limitations of reasonable quantity of semiconductor memory, a great number or all of such needs and the like, emotions, and the like may be stored within the memory cells of a digital computer, and then displayed or broadcast from a digital computer, as example, verbally, through the computer's loudspeaker in a way or order designated by the software program. The software program installed within the computer's memory is initially written by one or more persons whose goal is to provide the best possible simulation of the character or characters being visualized and authored by the game designer. The program creates an artificial person. In effect the person or, more accurately, the "being" exists only in the controller's computer, constituting a "virtual being". Many such virtual beings can be stored within the memory of a single computer.

Through the controller's programmed reaction to external stimuli and the pronouncements it verbalizes or speaks, an illusion is created of a real living being, particularly when the virtual person is visible to the player in the form of the toy character. The greater amount of available semiconductor memory, the greater amount of content that may be stored to characterize the virtual character, and, thus, the more effective the illusion created. Like the characters in a stage play, the credibility and realism of the illusion depends on the effectiveness of the author in devising a script that defines the characters. Even more life-like than a stage play, the controller is able to interactively involve the player in a scene, which a motion picture or stage play cannot do.

In accordance with one embodiment of the present invention, the vocabulary of the virtual characters comprises of about 1500 words/phrases, which are stored in controller 90's associated memory. The environment, however, is programmed to recite the phrases in many different ways. Thus, the environment commands about 50,000 different ways of expressing ideas and thoughts in accordance with the circumstances of the situation.

Those expressions and thoughts are placed in the context of the environment being replicated. With the doll house the replication is of a two parent family. Each character has a fundamental variety of "needs". As example, hygiene, toilet, food, love, fun and the like. Certain events will normally occur each day, as example, wake up, breakfast, lunch, dinner and retiring to sleep.

At a particular time of day, as example, at seven-o-clock in the morning every character will need to use the toilet and the baby will need its diaper changed. They need to eat breakfast, to wash, and ready themselves for the days activities. If Mom wakes up first, she occupies the toilet first. When she finishes and leaves the bathroom, it is Dad's turn to use the toilet.

For programming, a matrix of program subroutines is established to provide appropriate character to character conversations characteristic of each anticipated scenario. A wake up routine in the controller's program determines which character is first to awaken, and the order in which the other family members follow. The chronological order of individual wakening will vary in part depending upon the "health" information stored on the family members and the day of the week as may be accomplished by branching subroutines in the program. As example, on a weekday Mom and Dad may be the first to awaken, whereas on a Sunday, Dad may sleep late and arise last. And, if Dad's state of health is low, as when recovering from a cold, he may also sleep later. The "wake" part of the program thus may include a number of subroutines to cover all possibilities. When the program checks the time and date to learn that it is Sunday, and checks the family members state of health information to learn that all members are well, the program branches to a Sunday morning subroutine, and that subroutine has Dad sleeping late. Alternatively, in other less preferred embodiments the order of wake-up may be determined at random.

The main program will select the particular subroutine and the controller generates the conversations prescribed by that subroutine to replicate what occurs. As example, in one scenario, if Taylor, the pre-teen daughter character, needs to use the toilet and Dad is occupying it, Taylor will as Dad to "hurry up, that she needs to use the bathroom."

Some additional examples of the verbal statements used in the doll house environment, whether words, phrases, statements and the like, and the voices in which they are broadcast through the speaker, the environment's verbal repertoire, include:

Voice Mom

"Bill, it's time to get up"

"You can sleep another few minutes while I use the bathroom, but you've got to get up so you won't be late to work,"

"Thanks for getting the orange juice and milk ready for breakfast,"

"Bill, are you up? Erin, Taylor, it's time to get up,"

"Taylor, bring Billy downstairs so I can feed him while you're getting ready for school."

"Thanks, honey,"

"Hurry up and take your shower, Taylor. Breakfast will be ready soon,"

"Ok, Billy, here's your cereal."

"Want to go out, Puppy?"

"Please let Puppy out,"

"I wonder what the girls and their Dad would like for breakfast this morning,"

"Bacon and eggs is a great idea for breakfast,"

"Bill and Taylor love bacon and eggs."

"Milk and juice will taste good with bacon and eggs,"

"Taylor . . . Bill . . . Erin . . . Come on down. Breakfast is ready,"

"Let's dish up the food,"

"Let's eat"

"Bill, you and the girls better get going. It's 8:00 o'clock and Taylor's going to be late for school."

"Bye Bill, bye Taylor, bye Erin, have a good day,"

"OK Billy,"

"you can watch me workout."

"I think I'll go for a mile this morning,"

"Bill, why don't you grill some hamburgers or hot dogs for lunch and I'll make potato salad."

"Taylor, please change Billy,"

"This potato salad will be good,"

"Please feed Billy for me,"

"Let's eat at the picnic table in the backyard."

"Erin, you pick out what we'll drink"

"Try the potato salad,"

"We better get going,"

"You've got to get back to work, Bill, and Taylor and Erin have to go back to school."

Voice of Dad
"ZZZZZ"
"OK, I'll be out as soon as I shave."
"I'm finished shaving now."
"I wonder what tie I should wear today,"
"chuckle, chuckle,"
"I think I will wear the green one."
"Umm, that bacon smells good,"
"I'm hungry,"
"I'm going to make hamburgers, honey.,"
"The hamburgers are done,"
"Great lunch! Great cook!"
Voice of Baby Billy [SFX: "Wannnnnnn"]
"I need my diaper changed,"
"Ahhh, that feels good."
"I'm hungry. Please feed me."
"suck, suck, suck"
"Yum, that's good. I want more Mommy."
"Good, Mommy. Milk is good,"
"Cereal Mommy. I want cereal."
"chew, chew, chew"
"Cereal's good. I love cereal. More please. Mommy, more!"
"I love my bath. I want my rubber ducky."
"Tee hee ga goo,"
"I love my clean diaper."
"Wannna,"
"I don't want to sleep. I want to play."
"I need my diaper changed."
"my clean diaper feels good."
"I'm thirsty,"
"suck, suck, suck"
"Yum, that's good. I want more Taylor."
"Good, Taylor. I love milk,"
"I want carrots. Erin, feed me carrots."
"giggle,"
"munch, munch, munch,"
"I love carrots,"
"I want a hamburger too,"
Voice of Taylor:
"Here's a fresh diaper,"
"It's Puppy. She wants in AND she wants her breakfast!"
"Here's your breakfast, Puppy,"
"Dad, are you almost done showering? I need to use the bathroom."
"Mom, we're home for lunch,"
"I love hamburgers,"
"There, little brother. Your diaper is clean now."
"It's time for your lunch,"
"Sure,"
"Oh goodie, a picnic!"
"I think soda is good with hamburgers,"
"The hamburgers smell good, Dad,"
"These are yummy, Dad,"
Voice of Puppy:
"Bark, bark . . . Ruff, Ruff"
"Chomp, chomp, chomp"
"Lap, lap, lap."
"Yip, yip . . . yip, yip"

The foregoing are but examples. Other verbal messages are brought to mind by reading this specification, all of which come within the scope of my invention.

Further, some examples of stored sound effects are given:
"Ringgggggg."
"Flush"
water running"
"Sizzzzzzzzzzzle"

It should be appreciated that a part of the attractiveness of the invention to children, in addition to the novelty of the technology, lies in the presentation of the verbal elements, namely, the order in which statements are given. In one scenario, as example, the foregoing verbal statements and sound effects may be programmed in accordance with a script to emulate a character-to-character discourse along the lines which follow. For this example, it is helpful to simulate the imagination and fantasy of a typical female child who is the player for which the environment is designed who is using the environment and integrate her thoughts within the script. We identify that female player by the name "Amanda".

[Scene] 7:00 AM It's wake-up time for the Amazing Family. Precisely at 7:00 AM the family begins to come to life.
[SFX: "Ringgggggg."]
[scene] Amanda hears the alarm clock on the nightstand next to the Amazing Family Mom's bed and hopes Mom turns it off. Suddenly the light on Mom's nightstand goes on as Amanda hears Mom, still in bed, talking to her husband, Bill.
  "Bill, it's time to get up"
[scene] Amanda sits up in bed, thinking she had better get up or she won't have time to get her new family ready for the day. She goes to the Amazing House which her Dad put on a special low table in front of the bay window in her bedroom. The soft light from the lamp on Mom's night stand lights Mom and Dad's bedroom. The morning light streaming in Amanda's window lights the rest of the house. Mom and Dad are still in bed but they are awake and talking.
  "You can sleep another few minutes while I use the bathroom, but you've got to get up so you won't be late to work," says Mom.
[scene] Taylor, the girl her age, and her teen age sister Erin are still asleep in their bedrooms and Baby Billy is fast asleep in his crib in the nursery. The family's puppy is dozing in her doghouse in the backyard.
  "Come on, Mom," says Amanda to Mom, as she lifts her from her bed. "Let's go to the bathroom before everybody else is up."
[scene] Amanda bends Mom's knees and sets her on the toilet, taking care that her feet are in the Smart-spot (sensor) on the floor, and then pushes the flush button on the back of the toilet. It flushes
[SFX: "Flush"]
with a sound just like the one in Amanda's bathroom.
[scene] Amanda lifts her Mom from the toilet and places her [into the Smart-spot] in front of the sink. She pushes the faucet and hears the sound of water running.
[SFX: water running]
so she knows Mom has washed her hands face before she begins preparing breakfast.

Amanda removes Mom from the Smart-spot in front of the sink in the bathroom and takes her downstairs into the kitchen, placing her on the Smart-spot sensor by the stove. Amanda then opens the refrigerator door and takes out the orange juice carton and white milk carton and puts them one by one on the Smart-spot on the kitchen table.

"Thanks for getting the orange juice and milk ready for breakfast," says Mom to Amanda.

[scene] Amanda smiles, delighted that Mom is appreciating her help. Dad is still in bed and Amanda hears him snoring.

[SFX: snoring "ZZZZZ"].

"Bill, are you up? Erin, Taylor, it's time to get up," says Mom, who is usually the first one in the house to get up and always seems to have to get everyone else out of bed.

[scene] "Wake up Dad," says Amanda, as she takes him out of bed and puts him on the toilet.

[SFX: "Flush"].

Amanda flushes the toilet and then Dad [into the Smart-spot] in the shower

[SFX: "shower water on"].

[SFX: "Wannnnnnn"]

Amanda hears the baby crying as Mom shouts from the kitchen,

"Taylor, the baby's crying. See what the baby needs." "You stay there and shower," says Amanda to Dad, as she turns her attention to Taylor and the baby.

[scene] "Come on Taylor, let's get up and see what Baby Billy needs," says Amanda, as she takes Taylor out of her bed and "walks" her into the nursery, placing her [into the Smart-spot] next to the crib.

[SFX: "Wannnnnnn"]

"I need my diaper changed," says Baby Billy.

Amanda lifts Taylor's arms into which she gently places the Baby. She "walks" Taylor to the layette across the nursery and helps Taylor place the Baby [into the Smart-spot] on the layette.

"Here's a fresh diaper," says Taylor, as Amanda pretends to diaper Baby by pressing the diaper icon on the layette.

"Ahhh," coos Baby Billy, "that feels good."

As one appreciates, the invention allows substantial emulation of a real life situation, a virtual stage in which the child is partially a member of the audience and like the audience is drawn into the situation, stimulating the child's mind.

The foregoing sounds, vocabulary and conversations are exemplary. Other such statements or messages may be included depending on the desired features, activities, events of the particular virtual interactions, and the personality and attributes of the virtual characters.

The electronic controller 90 is preferably implemented in the form of a battery operated programmable microprocessor or microcontroller, as variously termed, and associated memory, including voice ROM, a separate sound and speech synthesizer or one defined in software, including a digital-to-analog converter, and appropriate multiplexers and other input and output interface circuits. It may be implemented in a custom semiconductor integrated circuit chip, although separate semiconductor chips may be used as an alternative, all of which are known. The microcontroller should be powerful and fast enough to proceed through the program and have the voices and character conversation appear natural.

As an alternative the controller may incorporate separate audio display controllers to handle generating the audio messages, freeing the main controller for other necessary activities. Display controllers are commonly found in personal computers for the video displays. They contain a separate micro-controller, and relieve the main microprocessor from the task of servicing the video display. Earlier generations of such microcontrollers have appeared heretofore in interactive toys.

Verbal messages are broadcast from the loudspeaker under control of the microcontroller by outputting the contents of various locations in the voice ROM, and applying that digital information to the digital-to-analog converter, serving as a speech synthesizer. The latter components output is applied to the loudspeaker to deliver the sound and/or speech. The digital form of the message is thereby converted to an analog form that drives the loudspeaker to produce the desired verbalization of audible sounds, words and other voice messages.

The verbal messages and sounds are preferably human voices that are recorded as digital information in a portion of the ROM memory, often called the voice ROM, using any standard technique. Those verbal messages, such as those earlier described, may be stored as complete sentences or, alternatively, as words and partial phrases, dependent in part on the amount of memory available or which one prefers to include.

For more efficient use of memory, the messages may be stored as appropriate as individual words, partial phrases, and/or full expressions. As an example, the verbal message: "Taylor, change the baby's diaper" may be parsed in separate parts and stored in different areas of the memory as "Taylor" and "change the" and "baby's diaper". Under program control, when the message for a diaper is called for during the course of the program, the micro-controller selects and consecutively outputs the two sections from the memory in proper order. Other verbal requests by Baby Billy for a cereal or milk, as examples, may likewise be constructed using the same initial phrase "I want", thereby requiring storage space for that phrase only once. The individual words and sub-phrases may be used over and over again allowing them to be played back in various sequences.

If even more efficient use of memory is desired, the digitized audio would be compressed using any conventional compression algorithm during the recording process; and the program should include implementation of an algorithm for decompressing that compressed digitized audio as it is played back.

As those skilled in the art appreciate, the foregoing implementation is illustrative. Many other forms of specific semiconductor circuits may be substituted to accomplish the described functions of my invention.

In a similar manner to the way in which controller 90 is programmed with information enabling it to keep track of the daily passing of time (i.e., a clock function), the controller, in addition to the heretofore mentioned clock function, may also be programmed to keep track of the weekly, monthly, and yearly passing of time (i.e., a calendar function).

Given the above described processes and functions, a person skilled in the programming arts is able to apply conventional programming techniques to program controller 90 to perform the described functions without undue experimentation. The program will be lengthy and, perhaps, tedious to author and de-bug, but requires no special programming skills. Various pointers, flags, etc. may be required to identify triggering events, etc. These can be utilized in the program in accordance with conventional approaches to program design.

The invention imparts virtual intelligence to the small characters that inhabit character environments. Transparent to the player, the invention recognizes the location of each character inhabitant and produces speech that reflects that character's feelings, thoughts, needs, and desires, enables the character to know what the player is doing to the character and if the child is responding to the character's requests. A young player will not necessarily realize that the character's intelligence was enabled or produced by means of the electronics in the character environment. Rather, the young player simply knows that the character "knows" its location within the character environment, what time of day it is, what the character wants to do, what it wants the player (child) to do, and so on.

The "intelligence" and speech are manifested when the character interacts with a sensor of some sort in the character environment. Any of the characters that inhabit a particular character environment has virtual intelligence when the player places the character on a sensor within the character environment and moves the character to another sensor within the character environment in response to requests or other dialog made by the character.

Giving the characters the ability to know the time of day, day of the week, day of the month, and month of the year, the characters will make various spoken statements appropriate to these periods. The characters will anticipate specific events and holidays with the player. The characters can speak about times specific to various locations in order to create various "intelligent and virtual" play pattern scenarios and dialogue. For example, at bedtime on the night before Christmas the character could have a quiet time and event specific dialogue regarding going to sleep now and anticipating opening Christmas presents tomorrow morning. The character environment can anticipate the player's birthday, and the toy characters can propose having a birthday party to celebrate. For the first time, tiny characters and personified objects will appear "smart" and "intelligent" throughout the day and will stimulate a play pattern for the child that is based on activities that should occur during a specific time of day and a specific date.

Reference is again made to FIG. 2. As earlier described, the basic doll house illustrated contained several attached modules. Those modules are detachable; and are included as supplementary options to the basic character environment, such as the garage 14, spa patio 15, barbecue patio 16 and horse stable 17. Those units are supplied as separate add-on modules that could be purchased separately later for inclusion in the environment, producing an expanded environment illustrated. Such character environments that are attached to other character environments to make a larger environment are hereinafter called "Add-on Character Environments" or, simply, "AOCEs".

The add-on module structure is attached to and/or detached from a position alongside the basic structure to place the additional structure physically contiguous thereto. It is an electronically dependent region. The add-on unit contains character sensors, electronic memory and the like whose operation and function are electronically dependent on controller 90 in the basic house. Provision is made in the electrical circuitry of the basic doll house for inclusion of these add-on modules.

In a less preferred embodiment, controller 90 contains multiple serial ports and electrical connections, not illustrated, extend through from the respective serial port to an electrical connector in the house that mates to an electrical connector in the add-on module. Controller 90 is then programmed to check all such ports for a connected module. Such mating electrical port connectors may also serve to provide the mechanical attachment to couple or fasten the expanded environment in contiguous relationship, solely or as a supplement to separate mechanical fasteners as may be included.

The controller determines if the additional modules are being used by checking its ports. If not, the controller moves on to its other tasks. If so, the controller's program knows how to access the sensors and ROM memory in those additional modules.

In this preferred embodiment, however, the doll house and modules are electrically connected together via a serial bus, such as illustrated schematically in FIG. 17 to which reference is made. Serial bus 122 extends from a serial port of the controller in the doll house in parallel to each of the AOCE modules 14, 15, 16 and 17, which connect to that bus via appropriate serial bus connectors SP-3, SP-1, SP-2 and SP-6 & SP-7. The bus extends through the BBQ patio to connector SP-6, through a cable to connector SP-7 associated with stable AOCE 17. The serial bus is shown with four wires, however additional wires for data and control may be included as found necessary or desirable. Controller 90 in doll house 1 is able to address and communicate with any one of the modules and the local controllers in the module are able to address and communicate with the principal controller in the doll house. As is conventional in the simple computer network illustrated, various priority protocol and control leads are included, but such detail is available in the technical literature and is known to those skilled in the computer art, and need not be discussed. Because they communicate over a common or shared data bus, only the controller that gains access to the bus may send data, and only the controller that is addressed may receive that data. Any AOCE is programmed to know the complete address register of the basic doll house and is able to request controller 90 to broadcast a phrase through its associated speaker. It is able to combine words, syllables, phrases, and sound effects in the ROM of the basic doll house with those in its own ROM. The local controllers in the modules are able to draw upon the contents of the ROM's in other modules and the basic doll house to ensure that particular play scenarios are continued as the player moves the characters from one module to another and to the basic doll house.

Bus 122 also includes an audio line through which audio signals may be applied for transmission to the loudspeaker in the doll house. That extra line and technique avoids any necessity for including a speaker in each module.

Referring again to FIG. 15, the garage AOCE 14 includes two appliances, a washer 95 and dryer 96, and a pair of additional sensors S42 and S43, located, respectively in front of the washer and dryer. It also contains the electronics package 97 located in one corner. The electronics package contains a local controller, similar to controller 90, suitably an IC chip containing a microprocessor and a read-only memory (ROM) with the ROM containing the various messages that relate to the garage, and batteries to supply power. Optionally it may also include a loudspeaker 98. As a preferred option, the garage also contains a DC motor controlled garage door, not illustrated. The DC motor is connected to the IR receiver, which is designed to respond to a code transmitted by IR from the IR transmitter, say, in car 18, later herein described, to remotely open or close the garage door.

The module contains a serial bus connector SP-3 for connection to the serial bus. Electrical wiring, not illustrated, in the module connects the sensors and ROM to the module's controller. The local controller's serial port is coupled to serial bus connector SP-3 and the latter connector mates with the serial bus connector, not separately numbered, located in the kitchen area of the basic doll house. Garage module 14 is thereby electrically connected into the circuit to controller 90 in the doll house.

Electronic controller 90 in the doll house and the local controller in the module are configured in a principal-to-auxiliary computer relationship. The auxiliary controller processes the associated sensors in the module. That is, it identifies the characters who are placed in the module's sensors. The character sensors allow the local controller to identify which toy character or characters are at the washer and/or dryer. The local controller then sends that information to controller 90 in doll house 1 via the serial bus. Controller 90 in turn is able to propound appropriate verbal messages or speech appropriate, as example, to garage based activities. To compose such verbal messages, controller 90 may be programmed to upload the contents of the module's ROM and store the contacts in local non-volatile memory, such as SRAM, to access when needed by that controllers program. Alternatively, controller 90 may be programmed to access the module's ROM when needed for that purpose. Because the amount of work required of the local controller is quite small in comparison to that required of controller 90, which is responsible for so many more sensors and the like, the local controller and its ROM are much smaller in capacity and speed than the former. Hence it may be more readily formed as a single IC.

Speech and other audio generated by the module's local controller is preferably adapted to broadcast that audio through loudspeaker 92 (FIG. 5) in the basic doll house, to avoid employing a loudspeaker in the module. For that arrangement, the module's local controller contains an audio chip to supply the local controller's audio output, that is audio frequency current, onto the audio lead in serial bus 122 (FIG. 17). Loudspeaker 92 (FIG. 5) in the doll house is operatively coupled to that bus lead. Audio current transmitted over the audio bus lead is picked up and reproduced by the speaker. Other more complex, and, hence, expensive techniques, including multiplexing, are known to those skilled in the art, which may be substituted, or multiple speakers may be used instead.

Assembling the add-on to the basic doll house is a simple procedure for an adult to accomplish. The garage module bus connector mates with and plugs into the corresponding doll house connector to form an electrical serial bus interconnection between the doll house and the AOCE. Alternatively, that connection may be made by a flex cable, such as the kind used internally within desk top computers to electrically interconnect the computer's cards and drives.

The other AOCE's function and connect in a like manner. Referring again to FIG. 5, the spa patio AOCE 15 contains a spa 100 a chaise lounge 101, five character sensors S37–S41, one of which is located in front of the chaise lounge. It also contains an electronics pack 102 located in one corner. The electronics pack includes a serial bus connector SP-1 for connection to the mating port in the basic doll house, batteries and another IC chip containing a microprocessor and ROM. Optionally the module may include a loudspeaker 104. The microcontroller contained in the IC chip includes a serial port that is wired, not illustrated, to serial bus connector SP-1, the latter of which connects through to the corresponding connector in doll house 1 thereby permitting communication with controller 90 in doll house 1. The latter microprocessor also bears a auxiliary to principal relationship with controller 90. Similarly electrical wiring, not illustrated, in the module connects the sensors to the appropriate sensor inputs in the AOCE's local controller, the IC chip. An additional serial bus connector SP-5 connects to the serial bus in parallel with connector SP-1 and is included for connection with an additional add-on module that may be connected at the other side of the module.

The module's chip contains the various verbal messages and sound effects that relate to the barbecue patio. The local controller checks the module's character sensor to identify any toy characters who may be located in the spa and/or at the chaise lounge. It can then furnish that information to controller 90 or, alternately, be programmed to process a verbal message using the contents of its ROM and/or the contents of the ROM in the basic doll house and then output the audio signal over the audio lead included in serial bus 122 (FIG. 17) to couple to the speaker in the basic doll house and thereby broadcast the verbal message.

Referring again to FIG. 4, the barbecue patio AOCE 16 contains a patio table 106 and four patio chairs 107–110 and a barbecue grill 111. The patio contains five character sensors, S32–S36, located in front of the chairs and barbecue; and five food sensors, AS10–AS14, located on barbecue 111 and in front of the patio chairs. It also contains an electronics package 112, containing a local controller, which includes a microprocessor chip and ROM; batteries; serial bus connector SP2 with wiring, not illustrated, similar to the other AOCE's, and, optionally a speaker. The latter microprocessor also bears a auxiliary to principal relationship with controller 90 in doll house 1. The ROM contains the various verbal messages and sound effects that relate to the barbecue patio. The character sensors permit the local controller to identify the toy characters at the respective chairs. The food sensors permit the local controller to determine what each character is eating and also what is cooking; and send that information to controller 90 in doll house 1.

Figures 15, 16:
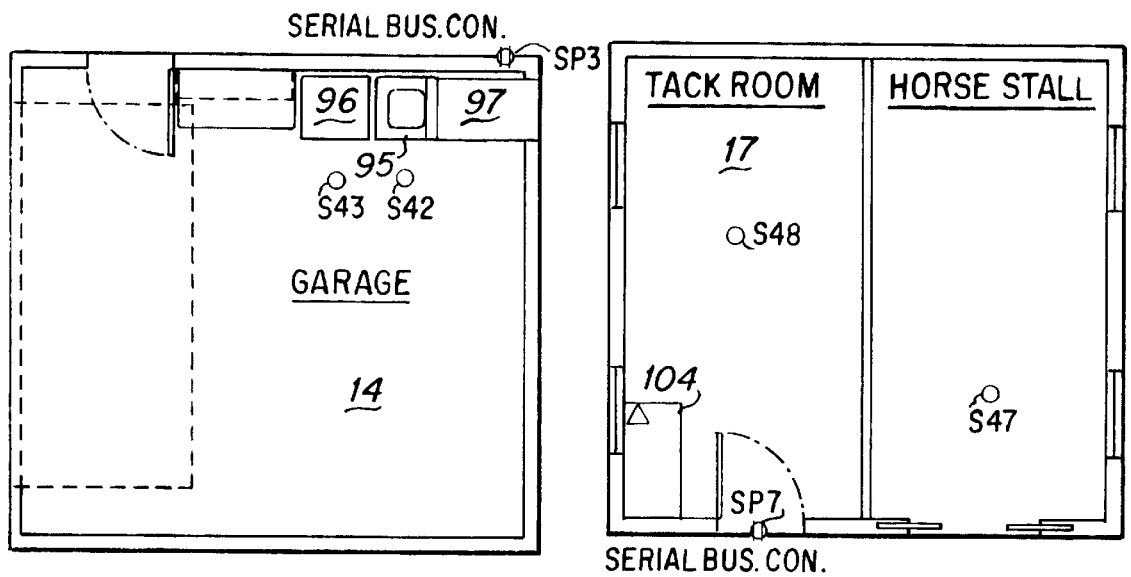
FIG. 15 is a layout of the garage add-on character environment used with the embodiment of FIGS. 1 and 2, earlier illustrated in a reduced scale.
FIG. 16 is a layout of the horse stable add-on character environment used with the embodiment of FIGS. 1 and 2, earlier illustrated in a reduced scale.

An add-on module need not be physically attached directly to the basic doll house, but may be connected thereto electrically by an electrical cable, containing the serial bus, serving essentially as an umbilical cord. Reference is made to FIG. 16, which offers an enlarged layout of horse stable 17 earlier illustrated in FIG. 2. The stable simulation contains a horse stall and tack room, is supplied with a toy horse, an "animal character", and incorporates two character sensors S48, located in the tack room and S47 located in the horse stall. It also contains an electronics pack 104 located in a compartment in one corner of the structure, containing batteries and another local controller or IC chip that includes a microprocessor and ROM, and a serial bus connector SP-7 for connection to the mating connector in a serial bus cable, later described in greater detail, which extends to bus connector SP-6 in the barbecue module, and ultimately to the serial port of controller 90 in the basic doll house. Similarly electrical wiring, not illustrated, in the module connects sensors S47 and S48 and ROM to the local controller; and to connect the local controller's microprocessor serial port to serial bus connector SP-7.

The ROM chip contains the various verbal messages that relate to the function of the horse stable. The character sensors identify the toy characters who are located in the tack room and/or horse in the stall to the local controller, and the local controller sends that information to controller 90 (or controller 90 retrieves that information from the local controller) to propound appropriate verbal messages for the player or sound effects of the horse whinning or neighing.

Reference again to the layout of FIG. 2. As illustrated in the layout, horse stable 17 is connected to barbecue patio 16 by a walkway in the environment. That walkway comprises a flat electrical serial cable 120, which is specially physically formed to define a path that extends through a ninety degree angle. Serial cable 120 is an extension of the serial bus 122 (FIG. 17) connects serial bus connector SP-7 in the horse stable to serial bus connector SP-6, which ultimately connects through to electronic controller 90, earlier described, located in the basic doll house.

The number of such AOCE's that may be used in a particular environment depends upon the number selected by the environment designer, since the toy manufacturer is required to provide appropriate electrical connectors for all such potential AOCE's with the original environment at additional expense, some or all of which may never be used. However, if electrical cables are acceptable, a suitable flex cable, containing multiple connectors in parallel circuit, may be supplied with the purchase of an initial add-on. That flex cable would contain additional connector sockets wired in parallel, again like that used in the desktop personal computer. With that arrangement, additional add-ons could be connected to empty sockets on such flex cable.

It should be appreciated that as additional AOCEs are attached to the doll house, the entire character environment expands and becomes more complex. The additional IC's and ROM adds further intelligence, programming, and vocabulary to the enlarged environment, accessible to doll house controller 90. Further, the doll house controller is able to communicate with the auxiliary controller in the AOCE, as example, that Dad is on the barbecue patio and steak is cooking on the barbecue. The AOCE's auxiliary controller reads its associated sensors and knows who is present in the AOCE. It communicates that information to main controller 90 in the doll house. Electronic controller 90 also is able to retrieve digital information stored in the auxiliary controller's associated ROM, and store it in the controllers SRAM memory for use. As joined, the electronics in the environment and the add-on modules form a seamless integrated package.

Enabling the characters to become more virtually intelligent when an add-on character environment is joined to the basic character environment by adding IC's with ROM for storing and processing additional speech and programming and having sensors recognizing the characters in the add-on character environment obviously enhances the child's experience. It can expand the characters in the add-on character environment, the vocabulary of the characters, the size and scope of the character environment that they occupy, and, with additional programming, the play pattern and how the environment interacts with the child.

It is also within the scope of the invention to include modules that are physically separate and independent, a stand alone character environment, as example, the car 18, earlier briefly referred to in connection with the discussion of FIGS. 1 and 2 or a detached workshop. Like the basic environment, such stand-alone character environments are also, virtually intelligent, containing their own complete electronics, such as earlier described for the basic doll house 1. Moreover, the stand alone environments are able to communicate with each other electronically. Such modules are not physically attached to each other, as room additions would be to a house, but rather are free standing environments belonging to a particular defined imaginary "world". An example, a work shop that belongs in the back of a house. It is part of the "property", yet is not attached to the house. Another is a school or store building that would be located a short distance away from the house. And a car is not attached to the house. It may come and go.

Reference is made to FIG. 18, pictorially illustrating the car 18 in larger scale than the prior figures. The car is such a stand alone environment. The car contains four character sensors S43–S46 located in the car seats, and a car seat containing a baby sensor BS6. These sensors permit the associated controller to know if baby is in the car seat, and identify the toy characters occupying the other seats. The car also includes an electronic package containing batteries for DC power, a loudspeaker, a local controller with a microcontroller and ROM chip and an Infra-Red transceiver, which enables bidirectional data communication with an IR transceiver located in the garage, which in turn communicates with controller 90 in doll house 1.

Such a relationship is further illustrated in the block diagram of FIG. 19 to which reference is made. In this embodiment two stand-alone structures, referred to sometimes as SACE's, one of which is the basic doll house of FIG. 1 (or its garage AOCE) are wirelessly linked together, suitably at infra-red frequencies, to form an expanded character environment. As example, such a relationship can be the doll house 1, earlier described in connection with FIGS. 1 and 2, and a work shop or toy automobile 18 (FIG. 18), physically separate from the doll house.

Each stand-alone environment contains its own electronics controller and ROM, i.e., an IC microprocessor, speech synthesizer, speaker, and/or other various components and the programming thereof, in order to make each unit function independent of the other unit or units. In other words, each toy contains a free-standing "virtual intelligence". A child or other player must be able to play with and have satisfaction and evolvement with each environment independent of another environment.

Further, the components in each stand-alone unit are virtually aware of the others and can relate to each other intelligently. In other words, the characters inhabiting the stand-alone units will, through conversation and sound effects, appear to be communicating with one another. That communication is preferably accomplished by the use of infra-red ("IR") signals or RF signals sent back and forth between multiple stand-alone character environments. Such communication technology is known to those skilled in the art and need not be described in detail.

The doll house (or its garage AOCE) thus contains an IR transceiver, ie. sender and receiver, 15, illustrated in dash lines, which is under control of controller 90. An IR transceiver is included in each Stand-alone Character Environment. The player of a SACE that wishes for one SACE to communicate with another SACE places both modules in Communication mode by toggling a mode switch 61. The mode switch activates the IR transceiver in both units and has them scan, that is, prepare to receive, an IR signal transmitted from one or more other SACE devices that have also been placed in "Communication" mode. If the signal was transmitted within the range of the signaling and receiving devices and within the directional targeted limitations of the communication device, if any, then the signal would be received.

At present one cost-effective means by which such inter-environment communication is accomplished is for programming and speech to be present initially in the ROM of each Stand-alone character environment. One simple play feature for the car is available if the garage module contains the motor controlled door option. On arriving at the garage, the car sends an IR signal to the IR receiver in the garage. The garage's IR receiver then actuates the door motor, which opens the garage door, neither of which is illustrated. The child might activate the sending of an IR communication to a second SACE when he causes, in play, a switch or signal to be given to the IC chip in the first SACE. That IR signal would signal the second IC to pull one or more specific sound effects or phrases from the ROM memory of the second SACE.

Such phrases can be in the form of recorded or compressed syllables, single words, multiple words, or entire phrases, that are then put together in a programmed sequence, to create whatever sentence, phrase, or sound effect that is desired to be verbalized through the speaker in the second SACE.

An example of play in the case of a doll house is for the mother character 57 to say she was going to call the dad character 58, who is driving the car. The player would lift the telephone in the doll house 1. In response, dialing touch tone sounds of the telephone numbers, and a couple of rings would then issue from the loudspeaker in the house. The IR transceiver in the doll house simultaneously transmits a signal to the IR receiver in the car. Upon receipt of the signal some milliseconds later, the phone in the car rings, the sound issuing from its loudspeaker. The child will then hear Dad answer the telephone. Dad says, "Hello."

The IR signal sent to the second SACE, the car, communicated to the car's IC local controller a coded signal that instructs the car's controller to produce speech located at a certain memory address number (for example address #100000). Instructions located at that address instruct the IC controller to produce a phrase of speech in a particular sequence by referring to particular single or multiple words or phrases in a list in the controller's programming.

In the foregoing example, the reference was only to a single word, "Hello." The car's IR transceiver would immediately transmit back to the doll house IR transceiver a coded signal to have the doll house controller 90 produce a phrase from a different address in the house controller's memory ROM (for example address #220000). The house controller would access that memory address, which in turn refers the controller to a specific sequence of recorded words and phrases from the doll house's word and phrase list stored the controller's ROM. In this example, the loudspeaker in the house, simulating what Mom is saying to Dad on the telephone, broadcasts the following phrase in Mom's voice, "Honey, please be here by 5 o'clock because we are having company for dinner."

Conversational sequences would occur between one or more SACEs depending on the time of day, what kind of play the child initiated, or what the characters inhabiting the SACEs requested. This communication between devices adds yet another layer and degree of virtual realism and intelligence to the play.

Enabling the characters to interact with one another in multiple Stand Alone Character Environments by adding Infra Red Transmitters and Receivers to the stand alone character environments enabling the addressing of various stored speech phrases and play patterns that relate to the characters expands the player's mental agility. The sensors in each SACE identify the characters in that SACE and their location. Where the player places the character, the identity of the sensors the player activates (such as a telephone), the play pattern, and programming logic, cause the characters in the multiple SACE's to interact with the player and with each other.

The same characters could be moved by the player from one stand-alone unit to the other. Each unit recognizes the character placed inside on the respective sensors, interacts with the character, and produces an acceptable amount of speech for the character that relates to the theme of the stand-alone environment. The foregoing is accomplished in a cost-effective manner, ideally minimizing the duplication of speech storage required in each of the secondary stand-alone environments and enabling maximum use of the previously stored speech of the basic environment.

The basic character environment may be enhanced in many other ways. As further example, with a calendar stored in the controller's read only memory (ROM) and appropriate controller programming, the environment can also know the day of the week, month, and year. National and religious holidays of many countries and religions may be stored in her universal calendar for as many years forward as is desired. The same player switches that enable the clock to be set to the present time of day and date, can be used to permit the child's parent to program into the controller the characters birthdays, country, religious preference, and even the state in which the player lives, adding to the toy character's illusion of "intelligence".

Then the controller may also be programmed to anticipate forthcoming "events" as national and religious holidays, the various toy character's birthdays, and even weather events in inter-character conversations. For example, if the player lives in New York State, about two weeks before Christmas one of the toy characters would appear to state, "I hope it snows for Christmas. It's only two weeks away!" Or, as the Mom character's birthday approaches, the Dad character might say, "What are we going to do on your birthday tomorrow?"

Returning to FIG. 5, the embodiment includes provision for individually adding additional toy characters. An additional character such as the teen characters boy friend, the teen character's best friend and/or the nine-year old character's best friend may be separately packaged and purchased. A plug-in type ROM memory is included in the package with the respective toy character, the ROM containing the relevant stored speech pertinent to the character and defining its virtual being and additional programming relating that character to other toy characters in the environment and an edge connector contacts. The ROM is placed in the ROM connector or, as variously termed, slot 91, which, as example, is located adjacent the electronics package at the upper right corner of the Family room 3 in the figure. With the ROM's contact pins engaging those in the slot connector the ROM card is placed into a circuit from which the ROM may be accessed by controller 90. The controller is programmed to check for any such addition, and, if so, load any program patches contained in the ROM and branch the ROM chip's stored statements into the main program.

As an additional feature to the invention, keypad 125 includes a mode switch 126, which is used to change the speed at which a day for the environment progresses from real time, the default condition, to an artificial time that progresses much faster than real time. That is, the mode switch results in making the electronic clock, and, hence, the time displayed on the LCD display 93, run faster. Thus from the time the mode switch is operated, events occurring thereafter in the environment will occur at times during an artificial day, when compared to the real time.

This feature is readily accomplished. As example, the pulses that drive the real time clock within controller 90 are derived from pulses produced by the microprocessor's "clock", which provides clock pulses at a rate that is orders of magnitude greater than one pulse per second. To obtain one pulse per second for the clock circuit, the microprocessor's clock output is supplied to a frequency divider, which at its output produces pulses at the rate of one pulse per second, which is then applied to the counter circuit forming a part of the real time clock.

That frequency divider typically contains multiple stages. As example a first stage may divide the supplied microprocessor supplied pulses by twelve, producing a pulse output only when it receives twelve pulses at its input; the next stage may in turn divide that output by four; a further stage divides by two and so on until the requisite rate of one pulse each second is obtained.

Setting the mode switch alternately connects the output of the frequency divider through to the clock input circuit and, alternately, the 2× time mode, in which it connects the output of the preceding stage in the frequency divider to the clock input. Since that prior stage delivers two pulses in each second, the clock is driven at a faster rate, twice as fast.

The program also contains subroutines to account for a change to the faster lapse of time. It includes a check of the mode switch position at various places during the course of its run. As one appreciates, the environment produces many events during the course of a day, some of which requires a definite and unalterable amount of "real time" to complete. Should the day be speeded up too much, unless corrected, it would be possible for the controller to be requiring some action before a prior activity being broadcast to the player is completed. Not only would that confuse the player, but could cause operation to fail. To avoid this it is necessary or desirable to bypass some of the activities that are otherwise programmed to occur during the morning, afternoon and evening during the real time mode.

A programmer who with an acquired understanding of the real time required for each activity would include appropriate subroutines in the program to check the mode switch position, prior to initiating the next activity. If the mode switch is in the 2× position, the program would then skip that activity. Thus although the day is speeded up, so to speak, the number of scenarios that would be presented the player would be reduced, retaining of course the required scenarios for breakfast, lunch, dinner and bedtime. In that way the child will not likely miss the omitted scenarios, and the environment retains the essential real life scenes.

The practical embodiment of FIGS. 1–6 employed toy character figures that are of an articulated construction. In less preferred embodiments in which movement of the figure's legs is not required, and the legs are stationary, the figure's legs may be mounted to a pedestal. With such construction, as example, the character's marker or identifier may be accessible from the bottom side of the character, that is, at the characters pedestal or bottom that supports the respective character's body. The marker may comprise the torso embedded resistor and electrical contacts on the side or bottom of the pedestal. The sensor used with such an embodiment contains a shallow receptacle like central circular opening, sufficient in diameter to receive the circular pedestal of the toy characters and side or bottom electrical contacts to mate with those on the pedestal.

It is appreciated further that still other markers and sensors may be substituted for those earlier described. As example, the foregoing embodiments used resistor identifiers and contact sensors for the dolls and environment. Other more complex markers and sensors may be substituted. As example, the identifiers could be an optical bar coded strip located on the foot end of the doll; and the sensor could be a miniature bar code scanner. In this case, the sensor could supply electronic data to the controller. This is similar to the technology used by the cashier in supermarkets.

As further example, the marker could be a resonant L-C circuit, a tuned circuit, encased within the doll; and the sensor could be a pulsed RF generator and an RF frequency detector. The RF generator could be gated on to produce an RF pulse that transfers energy to the tuned circuit in the doll. Thereafter the RF energy dissipates in the tuned circuit producing and radiating an RF "ringing" for a short period, RF whose frequency corresponds to the frequency to which the L-C circuit is tuned. And the frequency detector determines that frequency. The sensor would send that information as electronic data to the controller Thus each doll would contain an L-C circuit that is tuned to a different frequency. Such a technology is found in the anti-shoplifting devices used at the store exits in combination with tuned tags attached to the merchandise. Any other like identification technology may be employed so long as it may be miniaturized to physically fit within the doll house and is safe for use by children.

Although emulation of living beings is a principal feature of the environment, it should also be recognized that, alternatively or in combination with the foregoing, other "inhabitants" of such dwellings can be vehicles or other like things generally considered inanimate in nature, all of which come within the scope of the present invention. As example the environment can be a city with various streets and buildings and the vehicles inhabit the city and move throughout the streets. In this case, the environment would "know" what vehicles were where in the city throughout the day, and what kind of activities would be occurring.

The foregoing embodiment was a doll house in theme. In accordance with the invention other themes may be used for alternative embodiments. As example various buildings or structures, such as a shopping mall with teenage shoppers, a college dormitory with college students, male action playsets such as the "Bat Cave" in the case of a Batman(tm) playset, or a vehicle such as a spacecraft for a space theme or a Star Wars (tm) or Star Trek (tm) license. As further example the environment can be themed as a "cat" house, and the inhabitants, the doll figures, as kittens. Such a cat house would not need to be as grand a structure in size, and would contain, say, two or three rooms at most, with a more limited number of sensors appropriate to such a small playset. Add-on and/or stand-alone modules themed as space ships, as example, may concurrently communicate via IR transceivers and carry on a fight between space ships as in a space war.

The foregoing embodiment has been described in connection with the English language. It is appreciated that other languages may alternatively be employed in environments intended for children in non-English speaking countries.

The characters for the foregoing environment are essentially inanimate objects. They do not contain the electronics to produce a virtual character on their own, as in the case of the prior doll, such as the "Amazing Amy™", but merely a marker or identifier to identify them to the computer in the environment. They contain no speakers or amplifiers. They are physically small in size and could not contain those electronics. The electronic controller hidden within the environment, such as the doll house, gives each of those inanimate objects a "virtual being" and defines the personage for the player. Further, young children are conditioned to know that houses do not speak, but that people, that is, characters do. In hearing voices issuing from the speaker, a child, thus, is conditioned to mentally correlate those voices to the respective doll figures, and think that the doll figures are speaking. The house simulates the doll speaking, much as a ventriloquist simulates his dummy as speaking. This is a desired illusion.

The invention thus consolidates all the characters required in the environment within a single computer, only a single computer is needed. Separate computers for each of the toy characters is unnecessary.

With a large number of varied and numerous the requests and messages, selected at random or quasi-random, the toy environment offers the child a play pattern that minimizes repetition and engages the child's intelligence over long periods. Unlike virtual toys with little activity, the present invention does not repeat a single pattern often as would make the environment become boring, the bane of a toy's existence. Like some adults who repeat set patterns daily and become boring to others, without adequate variety even a "virtual being" can become boring.

The sensors used in the described embodiment are passive sensors. They detect the resistance and supply that resistance to the controller. More sophisticated alternative sensors, earlier briefly described, are active sensors. They contain electronics that are able to provide information identifying a sensed marker directly and supplying that information to the controller, which also thereby identifies the character, effectively moving some of the controllers processing function into the sensor, and accomplishing the same result. Thus in the invention the two types of sensors are seen to be equivalent.

As used herein, the term "virtual being" is recognized as meaning those verbalizations, such as statements and dialog of a living person or creature that allow others, here the player, to perceive that the person or creature has intelligence and a personality, which are stored within the memory and program of the computer, electronic controller 90. It also includes inanimate objects to which one wishes to treat as a living person or creature and have come alive by associating the inanimate objects with a respective virtual beings, allowing it to speak to and engage others in dialog. The program creates an artificial person. In effect the person or, more accurately, the "being" exists only in the controller's computer, constituting a "virtual being" that possesses "virtual intelligence" and a "virtual personality".

It is believed that the foregoing description of the preferred embodiments of the invention is sufficient in detail to enable one skilled in the art to make and use the invention. However, it is expressly understood that the detail of the elements presented for the foregoing purpose is not intended to limit the scope of the invention, in as much as equivalents to those elements and other modifications thereof, all of which come within the scope of the invention, will become apparent to those skilled in the art upon reading this specification. Thus the invention is to be broadly construed within the full scope of the appended claims.

Appendix I - Listing of Inputs to Basic Character Environment

| Room/Sensor location | Sensor ID | Momentary Switch | Comments |
|---|---|---|---|
| Teen's Bedroom (TB) | | | |
| Floor at computer | S1 | | ID who's using computer |
| Floor in front of Vanity | S2 | | ID who's using vanity |
| Floor by nightstand & telephone | S3 | | ID who's using phone when MS2 is pushed |
| Footboard of Bed | S4 | | ID who's in Bed |
| Nightstand with lamp | | MS1 | Lamp on-off switch |
| Teen's Telephone | | MS2 | Press to call or answer telephone |
| Teen's Computer | | MS3 | Press to have teen character work on computer |
| Child's Bedroom (9YB) | | | |
| Floor in front of computer | S5 | | ID who's using computer |
| Footboard Bed | S6 | | ID who's in Bed |
| Nightstand with lamp | | MS4 | Lamp on-off switch |
| Entry Door (ED) | | | |
| Doorbell | | MS13 | Produce bell ringing sound effect SFX |
| Floor at entry door | S31 | | ID who's at door, ringing doorbell |
| Nursery (N) | | | |
| Crib at Center Mattress | BS1 | | ID if baby occupies bed |
| Layette in Center of top | BS2 | | ID if baby is on layette |
| Nursery floor by crib | S7 | | ID character tending baby in crib |
| Nursery floor by layette | S8 | | ID character tending baby in layette |
| Layette to diaper | | MS5 | changes baby's diaper, if on layette |
| Nightstand with lamp | | MS6 | Light on-off switch |
| Master Bedroom (MB) | | | |
| Floor in front of vanity | S9 | | ID who's using vanity |
| Footboard of Bed | S10, S11 | | ID if Mom and Dad characters in bed |
| Floor by closet door | S12 | | ID character near closet |
| Floor by nightstand & bed | S13 | | ID who's using telephone |
| Nightstand with lamp | | MS7 | Light on-off switch |
| Telephone | | MS8 | Press to make or answer call |
| Teen's Patio (TP) | | | |
| Doghouse | S50 | | ID if dog is in doghouse - sleeping |
| Bath (B) | | | |
| Floor in front of sink | S14 | | ID who's at sink |
| Bottom of Tub | S15 | | ID who's standing in tub for shower |
| Floor at toilet | S16 | | ID who's sitting on toilet |
| Bath sink faucet | | MS9 | Produce running water sound SFX |
| Toilet tank top | | MS10 | Produce toilet flushing sound SFX |
| Back of tub | BS3 | | ID baby in tub |
| Counter button near shower | | MS11 | Produce shower running sound SFX |
| Family Room (FR) | | | |
| Floor in Front of Sofa | S18 | | ID who's on or by the sofa |
| Floor in front of computer | S19 | | ID who's sitting at computer |
| Floor in front of lounge chair | S20 | | ID who's sitting on (or standing) at lounge chair |
| Arm of Sofa | S21 | | |
| Playpen | BS4 | | |

-continued

Appendix I - Listing of Inputs to Basic Character Environment

| Room/Sensor location | Sensor ID | Momentary Switch | Comments |
|---|---|---|---|
| Back of Battery Box outside house | | O/F | On-Off switch to playset |
| Back of Battery Box outside house | | R | Reset button |
| Exercise | | | |
| Pedals of exercise bicycle | S17 | | ID who's on bicycle |
| Kitchen | | | |
| Floor in front of chair 1 | S22 | | ID who's in chair 1 |
| Floor in front of chair 2 | S23 | | ID who's in chair 2 |
| Floor in front of chair 3 | S24 | | ID who's in chair 3 |
| Floor in front of chair 4 | S25 | | ID who's in chair 4 |
| High Chair | BS5 | | ID baby in high chair |
| Floor in front of sink | S26 | | ID who's using sink |
| Sink faucet | | MS12 | Produce running water sound effect |
| Floor in front of cook top | S27 | | ID who's cooking |
| Floor in front of refrigerator | S28 | | ID who's by or using refrigerator |
| Floor by high chair | S29 | | ID who's feeding baby, when baby is in high chair |
| Table in front of chair 1 | AS1 | | ID food accessory being served to one in chair 1 |
| Table in front of chair 2 | AS2 | | ID food accessory being served to one in chair 2 |
| Table in front of chair 3 | AS3 | | ID food accessory being served to one in chair 2 |
| Table in front of chair 4 | AS4 | | ID food accessory being served to one in chair 2 |
| Back right cooktop burner | AS5 | | ID food accessory being cooked |
| Top oven shelf | AS6 | | ID food accessory being baked |
| Floor in corner by pantry | S30 | | ID dog at food bowl |
| Top refrigerator shelf | AS7 | | ID food item being refrigerated |
| Top pantry shelf | AS8 | | ID food item in pantry |
| Highchair tray | AS9 | | ID if baby is being fed |
| Exercise | | | |
| Pedals of exercise bicycle | S17 | | ID who's on bicycle |

What is claimed is:

1. A child's playset, comprising:
a plurality of toy characters, each of said plurality of toy characters being visually distinguishable from one another;
a character environment for receiving said toy characters therein;
said character environment including:
a plurality of locations for receiving toy characters, whereby a toy character may be positioned at any one of said plurality of locations if said location is unoccupied;
a loudspeaker associated with said character environment; and
an electronic controller associated with said character environment;
said electronic controller including at least one output for controlling said loudspeaker:
a store of virtual beings, said virtual beings being defined by audio elements associated therewith characteristic of each personality, and each said virtual being associated with a respective one of said plurality of toy characters;
said electronic controller for selecting from said store and audibly displaying through said loudspeaker audible elements of the respective virtual being associated with said toy characters, responsive to the presence of said toy characters in respective ones of said plurality of locations, whereby said character environment audibly reproduces audible elements of said virtual beings associated with said toy characters in lieu of audible reproduction of said audible elements directly by said toy characters.

2. The invention as defined in claim 1, wherein each of said toy characters includes an identifying marker, said identifying marker containing an indicium unique to the respective toy character, whereby said toy figures may be distinguished from one another by an associated indicium; and said character environment further includes:
a plurality of indicium sensors, said indicium sensors being distributed at said plurality of locations for receiving indicium information from said toy characters and supplying that indicium information to said electronic controller;
said electronic controller further including:
a store of indicium correlation information, correlating indicium information for each of said plurality of toy characters with respective ones of said plurality of virtual beings.

3. The invention as defined in claim 2, wherein said electronic controller includes information defining the location of each said indicium sensor within said character environment.

4. The invention as defined in claim 1, wherein said character environment comprises a simulated house to provide simulated living quarters for said toy characters, said house containing a plurality of compartments for simulating rooms.

5. The invention as defined in claim 4, wherein said rooms further comprise: a simulated kitchen, a simulated living room, a simulated bathroom and at least one simulated bedroom.

6. The invention as defined in claim 5, wherein said character environment further includes a plurality of simulated furniture, simulated utilities and simulated appliances disposed about said simulated rooms.

7. The invention as defined in claim 1, wherein said electronic controller comprises a programmed digital microcontroller, said microcontroller including a microprocessor and a memory.

8. The invention as defined in claim 6, wherein said electronic controller comprises a programmed digital microcontroller, said microcontroller including a microprocessor and a memory.

9. The invention as defined in claim 1, wherein said audio elements comprise verbal statements stored in digital electronic form.

10. The invention as defined in claim 9, wherein said electronic controller further comprises: digital-to-analog conversion means for converting verbal statements in digital electronic form to analog electronic form for application to said loudspeaker, whereby said loudspeaker acoustically reproduces said verbal statements.

11. The invention as defined in claim 8, wherein each of said toy characters includes an identifying marker, said identifying marker containing an indicium unique to the respective toy character, whereby said toy figures may be distinguished from one another by an associated indicium; and said character environment further includes:
   a plurality of indicium sensors, said indicium sensors being distributed at said plurality of locations for receiving indicium information from said toy characters and supplying that indicium information to said electronic controller;
   said electronic controller further including:
   a store of indicium correlation information, correlating indicium information for each of said plurality of toy characters with respective ones of said plurality of virtual beings.

12. The invention as defined in claim 11, wherein each said identifying marker comprises an electrical resistance and a pair of electrical contacts, said electrical resistance being in series circuit between said electrical contacts, and wherein said indicium comprises the resistance value of said electrical resistance; and wherein said resistance value of each of said identifying markers is distinct from one another.

13. The invention as defined in claim 12, wherein said toy characters comprise: a body containing an end; wherein said electrical resistance is encased in said body; and wherein said end includes said pair of electrical contacts to define therewith an electric plug.

14. The invention as defined in claim 13, wherein said indicium sensor comprises: a socket for mating engagement with said electrical plug; a pair of electrical contacts in said socket for respective connection with said electrical contacts in said plug; and electrical leads for coupling said pair of electrical contacts in said socket to said electronic controller, wherein said electronic controller identifies a toy character installed in the respective indicium sensor as a function of said resistance value.

15. The invention as defined in claim 1, wherein said electronic controller further includes:
   a programmable electronic clock calendar for keeping track of time of day and date;
   a visual display;
   means for coupling said electronic clock calendar to said visual display for displaying at least the time of day;
   a clock setting program for setting said electronic clock calendar to a time of day and date, said program including:
   cuing means for querying a player for the time of day and date;
   a data entry device for enabling a player to enter data into said electronic controller;
   said clock setting program, responsive to data entered by operation of said data entry device in response to a query, for setting said clock calendar.

16. The invention as defined in claim 15, wherein said electronic controller further includes:
   a mode switch for switching said electronic calendar & clock to an artificial time that progresses at a rate faster than real time, whereby the character environment operates in accordance with said artificial time.

17. The invention as defined in claim 1, further comprising:
   a visual display coupled to said electronic controller;
   a data entry pad coupled to said electronic controller permitting data to be entered into said electronic controller; and wherein said electronic controller includes:
   an electronic clock for keeping track of time and an output coupled to said display for displaying said time from said electronic clock on said visual display, said electronic clock normally outputting real time; and
   a mode switch coupled to said controller for switching said electronic clock to an artificial time that progresses at a rate faster than real time, whereby the environment operates in accordance with said artificial time.

18. The invention as defined in claim 1, wherein said character environment comprises a basic environment and a supplementary environment, said supplementary environment being electronically dependent on said basic environment and being detachably connected thereto.

19. The invention as defined in claim 18, wherein each of said toy characters includes an identifying marker, said identifying marker containing an indicium unique to the respective toy character, whereby said toy figures may be distinguished from one another through said indicium; and further comprising:
   a plurality of indicium sensors, said indicium sensors being distributed at said plurality of positions in said character environment, including said basic character environment and said supplemental character environment for receiving indicium information from said toy characters and supplying that indicium information to said electronic controller;
   said electronic controller further including:
   an indicium store correlating indicium information for each of said plurality of toy characters with respective ones of said plurality of virtual beings.

20. The invention as defined in claim 2, wherein said toy characters include:
   a plurality of person characters for simulating humans;
   a plurality of article characters for simulating foodstuffs consumed by humans;
   wherein said store of virtual beings includes:
   a virtual being for each of said person characters and a virtual being for each of said article characters.

21. The invention as defined in claim 20, wherein said plurality of indicium sensors include:
   a first plurality of indicium sensors for detecting and identification of person characters;
   a second plurality of indicium sensors for detection and identification of article characters.

22. The invention as defined in claim 6, wherein said electronic controller further includes a sound effects store containing a plurality of sound effects simulating operation of various home appliances and utilities in operation.

23. The invention as defined in claim 22, further comprising:
   a plurality of switches, said switches being distributed about said environment and associated with respective ones of said home appliances and utilities;
   said electronic controller for selecting and audibly displaying, through said speaker, a sound effect associated with a respective home appliance or utility, responsive to operation of a respective one of said plurality of switches associated with said respective home appliance or utility.

24. The invention as defined in claim 11, further comprising:
- a plurality momentary operate switches, said switches being distributed about said environment and associated with respective ones of said home appliances and utilities;
- wherein said electronic controller further includes a sound effects store containing a plurality of sound effects, each of said plurality of sound effects being associated with a respective one of said house appliances, and a correlation store correlating each of said momentary operate switches with a particular one of said plurality of sound effects; and
- wherein said electronic controller, responsive to momentary operation of a respective one of said plurality of momentary operate switches for selecting and audibly displaying, through said speaker, the one of said plurality of sound effects associated with said respective one of said plurality of momentary operate switches.

25. The invention as defined in claim 3, wherein said electronic controller further includes:
- a dialog store, said dialog store storing a plurality of dialogues to simulate verbal conversation carried on between toy characters at each of a plurality of particular times of day;
- clock means for determining the time of day; and wherein said controller is programmed to initiate a selected dialogue from said dialog store to simulate verbal communication between toy characters at said time of day, responsive to detection of said toy characters at said indicium sensors.

26. The invention as defined in claim 1, wherein said character environment comprises at least a first structure and a second structure separate from said first structure.

27. The invention as defined in claim 26, wherein said second structure is located contiguous to and is detachably attached to said first structure;
- said second structure, further including:
- at least one of said plurality of character sensors;
- a supplemental memory, said supplemental memory containing additional verbal statements, and at least some of said additional verbal statements being in reference to said second structure; and
- coupling means for operatively coupling said at least one sensor and said semiconductor memory in said second region to said electronic controller for enabling said electronic controller to selectively access and broadcast verbal statements stored in said supplemental memory and to detect the presence of a toy character in said second structure.

28. The invention as defined in claim 26, wherein said second structure, includes:
- at least one of said plurality of character sensors;
- a supplemental memory, said supplemental memory containing additional verbal statements, and at least some of said additional verbal statements being in reference to said second structure; and
- coupling means for operatively coupling said at least one sensor and said semiconductor memory in said second region to said electronic controller for enabling said electronic controller to selectively access and broadcast verbal statements stored in said supplemental memory and to detect the presence of a toy character in said second structure.

29. The invention as defined in claim 28, wherein said coupling means comprises electric cables and connectors.

30. The invention as defined in claim 28, wherein said coupling means comprises wireless transceivers.

31. The invention as defined in claim 28, wherein said coupling means includes:
- a first electrical connector supported by said first structure;
- a second electrical connector supported by said second structure;
- said second electrical connector for mating with said first electrical connector to extend electrical connections therethrough; and
- said electronic controller having a port, said port being connected to first electrical connector;
- said electronic controller further including means for detecting coupling to said second structure and for retrieving there through verbal statements stored in said supplemental memory of said second structure and identifying any toy character in said second structure sensed by said at least one character sensor in said second structure.

32. The invention as defined in claim 1, further comprising:
- a supplemental toy character;
- a supplemental store of verbal messages defining a virtual being to said supplemental toy character;
- said electronic controller including coupling means for providing access to said supplemental store, whereby said virtual being of said supplemental character is included within said character environment.

33. The invention as defined in claim 2, wherein said audio elements comprise verbal statements stored in digital electronic form.

34. The invention as defined in claim 33, wherein said electronic controller further comprises: digital-to-analog conversion means for converting verbal statements in digital electronic form to analog electronic form for application to said speaker, whereby said speaker reproduces said verbal statements.

35. The invention as defined in claim 34 wherein each said identifying marker comprises an electrical resistance and a pair of electrical contacts, said electrical resistance being in series circuit between said electrical contacts, and wherein said indicium comprises the resistance value of said electrical resistance; and wherein said resistance value of each of said identifying markers is distinct from one another.

36. The invention as contained in claim 26 wherein said second structure is located contiguous to and is detachably attached to said first structure;
- said second structure, further including:
- at least one of said plurality of character sensors;
- a local controller, said local controller including:
- a supplemental memory, said supplemental memory containing additional verbal statements, and at least some of said additional verbal statements being in reference to said second structure; and
- coupling means for operatively coupling said at least one sensor to said local controller to permit said local controller to identify toy characters placed in said at least one character sensor;
- said electronic controller and said local controller being configured in a principal and auxiliary relationship, wherein said local controller sends information on any toy character identified by said local controller to said electronic controller.

37. The invention as defined in claim 36, wherein said electronic controller includes means for accessing said supplementary memory in said second region wherein said electronic controller may broadcast verbal statements stored in said supplemental memory based on toy character information sent by said local controller.

38. The invention as defined in claim 26 wherein said electronic control further includes:
   program means for determining the state of well-being of said toy characters.

39. An accessory for an interactive electronic play environment for toy characters, said interactive electronic play environment, including a microprocessor with an accessible microprocessor port, comprising:
   an accessory toy character; and
   a semiconductor read only memory, said semiconductor read only memory containing digital information defining a virtual being for said accessory toy character, said semiconductor read only memory further including electrical contacts for enabling said semiconductor read only memory to plug into said microprocessor port of said electronic play environment wherein said accessory toy character and said digital information defining a virtual being associated with said accessory toy character is integrated within and identified by said play environment at any of a plurality of locations in said play environment.

40. In a electronic toy containing a programmed digital micro-controller and an electronic clock for normally tracking the time of day and a display for displaying the time of day supplied by said electronic clock, said programmed digital micro-controller being programmed to run selected time based routines at certain hours of the day and to periodically check said clock device to determine the time of day, said programmed digital micro-controller being programmed to run over the course of said day and initiate and display selected time based activities at preselected hours during a day to simulate an activity normally occurring at those preselected hours, each of said time based activities requiring a respective defined interval of said real time to complete; the improvement therein wherein said electronic clock includes:
   a first time-keeping mode in which to record the progress of real time; and
   a second time-keeping mode in which to record the progress of an artificial time, said artificial time advancing at a rate at least twice as fast as said real time; and
   user operated mode switch means for permitting a user to change said electronic clock's time-keeping mode.

41. The invention as defined in claim 40, wherein said programmed digital micro-controller is responsive to said clock being in said second time-keeping mode for advancing said program at a rate corresponding to said artificial time instead of said real time, except during occurrence of said time based activities.

42. A child's playset, comprising:
   a plurality of toy characters, each of said plurality of toy characters being visually distinguishable from one another and configured to represent any of a person and animal; said toy characters including: a plurality of person characters for simulating humans; and a plurality of article characters for simulating foodstuffs consumed by humans;
   each of said toy characters includes an identifying marker, said identifying marker containing an indicium unique to the respective toy character, whereby said toy figures may also be distinguished from one another by an associated indicium;
   each said identifying marker comprising an electrical resistance and a pair of electrical contacts, said electrical resistance being in series circuit between said electrical contacts, and wherein said indicium comprises the resistance value of said electrical resistance, and wherein said resistance value of each of said identifying markers is distinct from one another;
   a character environment for receiving said toy characters therein;
   said character environment comprising a simulated house to provide simulated living quarters for said toy characters, said house containing a plurality of compartments simulating rooms, said rooms comprising at least a simulated kitchen, a simulated family room, a simulated bathroom and at least one simulated bedroom; and a plurality of simulated furniture, simulated utilities and simulated appliances disposed about said simulated rooms;
   a plurality momentary operate switches, said switches being distributed about said environment and associated with respective ones of said home appliances and utilities;
   said character environment further including:
   a plurality of locations distributed within said rooms for receiving toy characters, whereby a toy character may be positioned at any one of said plurality of locations if said location is unoccupied;
   a plurality of indicium sensors, said indicium sensors being distributed at said plurality of locations for receiving indicium information from said toy characters, each said indicium sensor comprising: a socket for mating engagement with said electrical plug, a pair of electrical contacts in said socket for respective connection with said electrical contacts in said plug;
   a loudspeaker; and
   an electronic controller, said electronic controller comprising a programmed digital microcontroller, said digital microcontroller including a microprocessor and a memory;
   said electronic controller being coupled to said plurality of indicium sensors for receiving indicium information and identifying a toy character installed in a respective indicium sensor by determining the resistance value associated with the respective toy character;
   said electronic controller including:
   a store of virtual beings, said virtual beings being defined by audio elements characterizing intelligence and personality, said audio elements comprising verbal statements stored in digital electronic form, and each said virtual being being associated with a respective one of said plurality of toy characters;
   digital-to-analog conversion means for converting verbal statements in digital electronic form to analog electronic form for application to said loudspeaker, whereby said loudspeaker acoustically reproduces said verbal statements;
   a store of indicium correlation information, correlating indicium information for each of said plurality of toy characters with respective ones of said plurality of virtual beings;
   a sound effects store containing a plurality of sound effects, each of said plurality of sound effects being associated with a respective one of said house appliances;
   said electronic controller for selecting from said store and audibly displaying through said loudspeaker, audible elements of the respective virtual being associated with said toy characters, responsive to the presence of said toy characters in respective ones of said plurality of locations and for selecting from said store and audibly displaying through said loudspeaker a plurality of sound effects for simulating operation of various home appliances and utilities;

said electronic controller, responsive to momentary operation of a respective one of said plurality of momentary operate switches for selecting and audibly displaying, through said loudspeaker, the one of said plurality of sound effects associated with said respective one of said plurality of momentary operate switches said electronic controller further including:

a programmable electronic clock calendar for keeping track of time of day and date;

a visual display;

means for coupling electronic clock calendar to said visual display for displaying at least the time of day;

a clock setting program for setting said electronic clock calendar to a time of day and date, said program including:

cuing means for querying a player for the time of day and date;

a data entry device for enabling a player to enter data into said electronic controller;

said clock setting program, responsive to data entered by operation of said data entry device in response to a query, for setting said clock calendar.

* * * * *